United States Patent
Akemann

(10) Patent No.: US 6,184,899 B1
(45) Date of Patent: Feb. 6, 2001

(54) ARTICULATED FIGURE ANIMATION USING VIRTUAL ACTUATORS TO SIMULATE SOLUTIONS FOR DIFFERENTIAL EQUATIONS TO DISPLAY MORE REALISTIC MOVEMENTS

(75) Inventor: Peter Akemann, Marina Del Rey, CA (US)

(73) Assignee: Treyarch Invention, L.L.C., El Segundo, CA (US)

(*) Notice: Under 35 U.S.C. 154(b), the term of this patent shall be extended for 0 days.

(21) Appl. No.: 08/829,404

(22) Filed: Mar. 31, 1997

(51) Int. Cl.[7] .................................................. G06T 17/00
(52) U.S. Cl. .......................... 345/473; 345/474; 345/475; 345/945; 345/953
(58) Field of Search .................................. 345/473, 474, 345/475, 949, 953

(56) References Cited

U.S. PATENT DOCUMENTS

| | | | |
|---|---|---|---|
| 3,510,210 | * 5/1970 | Haney ...................................... | 352/39 |
| 4,031,956 | 6/1977 | Terry . | |
| 4,303,914 | 12/1981 | Page . | |
| 4,809,202 | 2/1989 | Wolfram . | |
| 4,998,168 | 3/1991 | Gillard . | |
| 5,012,336 | 4/1991 | Gillard . | |
| 5,012,337 | 4/1991 | Gillard . | |
| 5,053,760 | * 10/1991 | Fraiser et al. .......................... | 345/473 |
| 5,090,042 | 2/1992 | Bejjani et al. . | |
| 5,136,686 | 8/1992 | Koza . | |
| 5,148,513 | 9/1992 | Koza et al. . | |
| 5,161,803 | 11/1992 | Ohara . | |
| 5,162,907 | 11/1992 | Keating et al. . | |
| 5,214,758 | * 5/1993 | Ohba et al. ........................... | 345/473 |
| 5,261,820 | 11/1993 | Slye et al. . | |
| 5,327,158 | 7/1994 | Takahashi et al. . | |
| 5,400,052 | 3/1995 | Otake et al. . | |
| 5,404,426 | 4/1995 | Usami et al. . | |
| 5,405,151 | 4/1995 | Naka et al. . | |
| 5,421,576 | 6/1995 | Yamazaki et al. . | |
| 5,424,963 | * 6/1995 | Turner et al. ......................... | 364/578 |
| 5,470,080 | 11/1995 | Naka et al. . | |
| 5,483,630 | * 1/1996 | Unuma et al. ........................ | 345/475 |
| 5,506,949 | * 4/1996 | Perrin .................................... | 345/473 |
| 5,513,307 | 4/1996 | Naka et al. . | |
| 5,619,628 | * 4/1997 | Fujita et al. .......................... | 345/427 |
| 5,623,428 | * 4/1997 | Kunii et al. .......................... | 364/578 |
| 5,767,861 | * 6/1998 | Kimura ................................. | 345/473 |
| 5,835,693 | * 11/1998 | Lynch et al. ........................... | 395/95 |
| 5,889,532 | * 3/1999 | Boucher et al. ...................... | 345/473 |
| 5,982,389 | * 11/1999 | Guenter et al. ....................... | 345/474 |
| 5,986,675 | * 11/1999 | Anderson et al. .................... | 345/473 |
| 6,014,150 | * 11/1999 | Boucher ................................ | 345/473 |

OTHER PUBLICATIONS

Ken Shoemake, "Animating Rotation With Quaterion Curves", Proceedings of SIGGRAPH 1985, San Francisco, vol. 19, No. 3, pp. 245–254.*

Watt et al., "Advanced Animation and Rendering Techniques—Theory and Practice", ACM Press, New York, New York, 1992, Chapter 16, Animating Articulated Structures, pp. 369–384.*

SOFTIMAGE | 3D, Animating, A Comprehensive User's Guide, pp. 129–142, 1306–1311, 1996.*

* cited by examiner

Primary Examiner—Mark Zimmerman
Assistant Examiner—Cliff N. Vo
(74) Attorney, Agent, or Firm—Richard K. Robinson

(57) ABSTRACT

A computer, such as a PC, includes a memory having an imaging program stored in it and a display unit, such as a raster scan CRT are all operatively connected together so that the computing unit can generate a signal that will result in an image being displayed on the display unit. The image includes a moveable figure that moves in response to inputs being provided via an input terminal, towards a set of targets. In response to the inputs from the input terminal, the computer initiates a set of actuators to move the figure wherein each actuator defines the movement in a given plane.

92 Claims, 12 Drawing Sheets

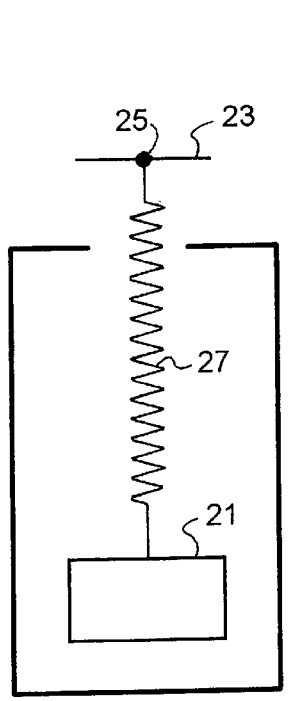
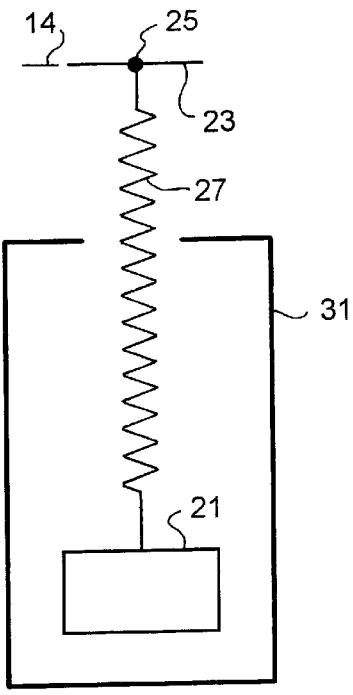
FIG. 2A    FIG. 2B
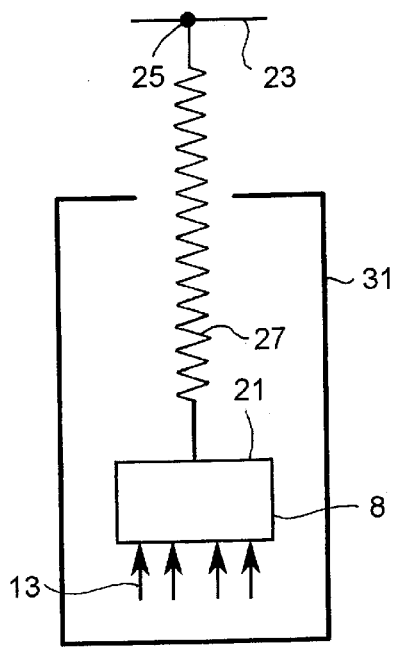
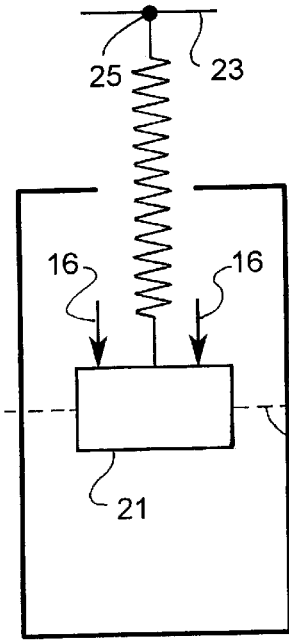
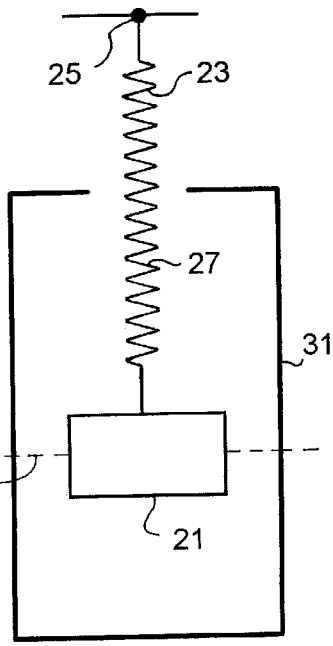
FIG. 2C    FIG. 2D    FIG. 2E

ARTICULATED FIGURE ANIMATION USING VIRTUAL ACTUATORS TO SIMULATE SOLUTIONS FOR DIFFERENTIAL EQUATIONS TO DISPLAY MORE REALISTIC MOVEMENTS

BACKGROUND OF THE INVENTION

This invention relates to an apparatus and method for generating three-dimensional computer graphics illustrating the movement of a figure or a portion of a figure on a display. More particularly, the invention relates to the use of actuators to provide realistic movements of the figure.

Video games are becoming more and more prevalent and challenging to the players. As a consequence, there is a strong demand for movements of the game figures to be realistic. In the past, when a figure moved on a video game, it was represented as a blur or with prerendered animation. However, the technology formerly associated with video games is now being used more widely in an area commonly referred to as multimedia. Multimedia includes the preparation and showing of displays or business presentations, interactive presentations and even motion pictures. Consequently, the requirement for realism in the movement of the characters, or a portion of a character, has become paramount to the program developers.

For example, in U.S. Pat. No. 5,404,426, there was disclosed a process for displaying, on a display screen using three-dimensional computer graphics techniques, hair modules of human or animal hairs. Each hair module is constructed of a plurality of rod shaped hair elements. The magnitude and direction of an external force applied to each hair element is designated. A deformation quantity of each hair element is obtained such that the external force having the designated magnitude and direction equilibrates with an internal force generated by the rigidity of each hair element. The shape of each hair module is determined in accordance with obtained information quantities for displaying the shape of each hair module. The hair model can be displayed on interactive controlled man-made machines such as personal computers.

Motion is usually defined by the solution to differential equations. Attempts have been made to simulate systems described by partial differential equations. One example of that is provided by U.S. Pat. No. 4,809,202 which is a method and apparatus for simulating systems described by partial differential equations.

The use of computer generated images on a display in video games is well known. An example of a more recent advancement in the video game area is disclosed in U.S. Pat. No. 5,470,080. This patent provides a method for controlling the display of a game character's movement in a video game. The method includes the steps of displaying a first play field screen on an upper portion of a video display screen using an interlace video screen rendering technique. A second play field is disclosed on the lower portion of the display screen also using interlace video screen rendering techniques. The movement of a first game character within the first play field screen is provided from an input user device. The control of a second game character within the second play field screen is provided from a second input user device.

The processing of the video images is also well known. A recent method was disclosed in U.S. Pat. No. 5,327,158 wherein a video processing apparatus included a video random access memory "VRAM" in which imaged data of original background picture was stored. An address of a VRAM, in a case where the original background picture is rotated and enlarged or reduced, is calculated by a background picture address control circuit on the basis of a constant set by a CPU. Color data of the background picture, at the time of the rotation process and enlargement or reduction process is read from the address of the VRAM and a video signal, is generated by the color data.

In U.S. Pat. No. 5,513,307, there is provided a method for displaying a video game character traversing a video game play field. The system that executes the method includes a video screen display, a user graphics controller and a digital memory. The video game character follows a path within the play field wherein the method of following the path includes the steps of storing multiple collision blocks that define respective path segments; dividing the play fields into multiple path blocks that comprise the path; storing character collision type information; storing references from individual path blocks to individual collision blocks; displaying character movements through the play field from path block to path block along the path in response to user inputs to the graphics controller; controlling the display of the character movement by causing the character image to follow a path defined by the path segment of individual collision blocks; and challenging the stored character collision type information when the character path passes a prescribed location on the play field.

Many times, there are multiple game characters displayed. In U.S. Pat. No. 5,405,151, there was disclosed a method for controlling the motion of two game characters in a video game for use in a system which included a video display screen, a user control graphics controller, a memory, a first user input device and a second user input device; wherein movement of the first game character is responsive to the first user input device and movement of the second game character is responsive to the second user input device; wherein the video game involves the game characters traversing a playing field which is displayed as a series of video screen images. The method includes the steps of providing a succession of game character movement commands to the first user input device in order to control the movement of the first game character through the play field; displaying a succession of movements of the first character within the play field in response to successive commands provided to the first user input device; storing the succession commands provided to the first user input device and the digital memory and displaying the successive movements of the second character through the play field in response to the succession of the stored input devices.

In U.S. Pat. No. 5,261,802 entitled "Computer Simulation Playback Method and Simulation", there was disclosed a computer simulated playback method including the steps of recording commands entered during the use of a simulation; operating the simulating demands with the recorded commands and allowing new commands to be entered at any point during the step of operating the simulations with the recorded commands. More specifically, the inventive method runs a simulation on a computer system that includes a user input device and a visual display. Images are shown in the display and the person using this simulation enters commands through the user input device. The commands effect the images shown on the visual display and are recorded in the sequence that were entered. The method then runs the simulation again and automatically enters the recorded commands at the same sequence that they were recorded so that substantially the same images that were produced when the commands were initially entered are displayed again. During the steps, new commands can be entered. When certain new commands are entered, the recorded commands are prompted and the user can use the simulation anew from the point where the new commands were entered.

SUMMARY OF THE INVENTION

A computer, such as a PC, includes a memory having an imaging program stored in it and a display unit, such as a raster scan CRT or liquid crystal display are all operatively connected together so that the computing unit can generate a signal that will result in an image being displayed on the display unit. The image includes a moveable figure that moves in response to inputs being provided via an input terminal, towards a set of targets. In response to the inputs from the input terminal, the computer initiates a set of actuators to move the figure wherein each actuator defines the angular movement in a given plane or linear movement along a given ray.

Virtual actuator is defined as a method for simulating the solution to a differential equation with a computer.

The computer generates a sequence of displays (herein after referred to as "frames") and each actuator defines the position of a moveable element in each frame in its plane or ray. Each actuator defines an acceleration value being equal to a minus constant (k) times the displacement of the moveable element on the display unit minus a second constant ($\delta$) times a velocity value, the velocity value is defined as the rate of change in the position of the moveable element between frames. Additionally, the velocity value is based upon the velocity value of a previous frame plus the acceleration of the current frame.

For each plane of movement at the joint there is an actuator provided. However, in one embodiment, the figure includes a body having a first, second and third element which may represent an upper arm, forearm, and hand connected to a shoulder, elbow and a wrist respectively. In this embodiment, the hand at the wrist can move in two planes and a ray defined by the shoulder and hand. These three degrees of motion of the hand are identified as follows: $\rho$ is the bending of the elbow to move the hand along the ray defined by the hand and the shoulder; $\theta$ is angular motion in the XZ plane; and, $\Psi$ is angular motion in the XZ plane.

In an alternate embodiment there is provided a figure having first, second and third elements representing an arm, the figure has a shoulder joint with three planes of movement, $\theta$, $\Psi$ and $\phi$, $\phi$ being in the XY plane. The elbow has one plane of movement which is defined as being in the $\phi$ plane and the wrist has two planes of movement which are defined as the $\phi$ and $\Psi$ planes. Having an actuator for each plane of movement for each joint enables the image being displayed to have realistic movement.

The character of the movement of the figure in the image may be changed through the variance of the first and second constants. It has been determined that the ratio sequence of the square of the first constant to the second constant should equal a constant value such as 0.05. If the first constant is a high number, then the figure will be agile whereas the smaller the first constant is, the more lethargic the figure will be. $\delta$, the drag coefficients represent the resistance encountered by the figure in its movements.

This technique may be used to generate video games and there is provided a method of controlling the motions of two game characters for use in a video display system. The user executes movements of the character through an input terminal. The agility of the character is defined by the adjustment of the first coefficient as well as the drag to the movement through adjustment of the second coefficient. These movements are stored in a memory and retained to use when a second player tests his skills against the sequence of movements previously stored in the game memory.

The simulation of movements of the characters may be altered as mentioned previously or movements of actual models may be stored and enhanced through the adjustment of the first and second constants.

BRIEF DESCRIPTION OF THE FIGURES

FIGS. 2a–2e a series of displays illustrating the simulation of an equation of motion according to the invention;

DETAILED DESCRIPTION OF THE EMBODIMENTS

Figure 1:
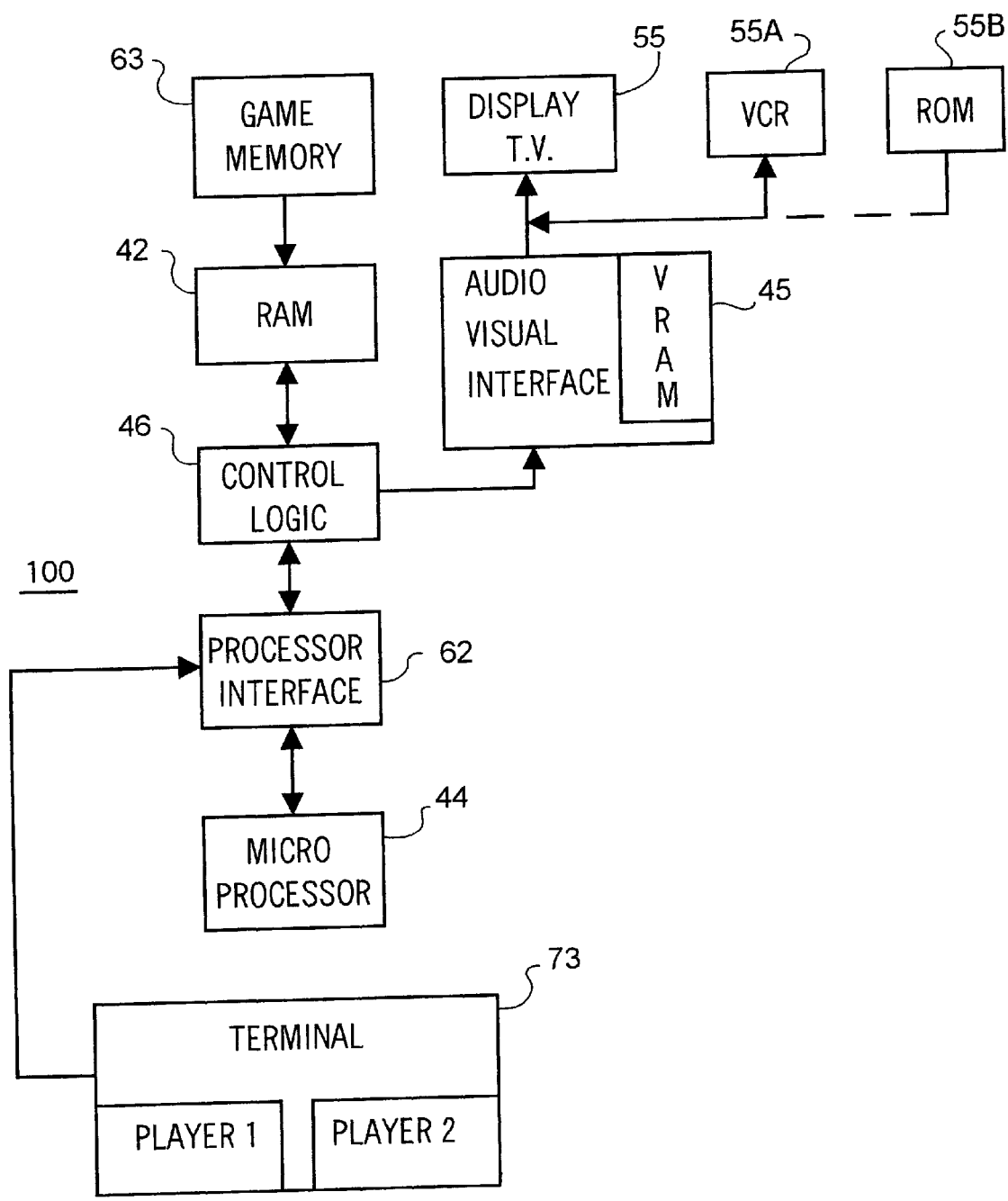
FIG. 1 is a is a block diagram of a computing system according to the invention.

Referring to FIG. 1, there is shown a block diagram of the imaging system 100 according to the invention. The imaging system 100 can be a video game system, such as that disclosed in U.S. Pat. No. 5,513,307; a personal computer having graphic capabilities or a professional imaging system. The imaging system 100 includes a game memory 63 which can be a device such as a CD player with a CD ROM; a game cartridge which is a ROM mounted on a chip for inserting into a slot as is also described in the above referenced patent or even a video player. Connected to the game memory is a RAM 42 that receives the imaging information from the game memory and stores that information.

An input terminal 73 is connected to a processor interface 62. The input terminal 73 can include multiple player control inputs wherein each player has an input terminal that can be one or more input that includes buttons, keys, mice or joy sticks for controlling the movement of the images that are generated on to a display 55, from data stored in VCR 55a or ROM 55b. The buttons on the input terminal 73 initiate the operation and are used to establish a set of targets for moving an image or a portion of an image to the targets. The audio visual interface 45 includes a device such as a video RAM (herein after referred to as "VRAM") that stores graphic patterns as well as the sound video interface circuits such as those provided in most personal computers. The VRAM addresses correspond to the locations on the display 55. As the display 55 is scanned line by line, patterns corresponding to the graphic information are received and video signals are produced which are representative of the graphic patterns. The audio visual interface 45 selects the appropriate signal and if it is a raster scan type of monitor on a dot by dot basis, the image is displayed on the display 55. The operation of the display 55 is well known in the art.

Control logic 46 is used to interface a microprocessor 44 output to the audio visual interface 45 and consequently the display 55. It also is the interface between the input RAM 42 and the input terminal 73 which also interfaces to the microprocessor 44 via the processor interface 62 which is controlled by the control logic 46.

TABLE OF EQUATIONS

1.) $x''_n = kx_{(n-1)} - \delta x'_{(n-1)}$; $x'_n = x'_{(n-1)} + x''_{(n-1)}$; $x_n = x_{(n-1)} + x'_n$
2.) $\delta/k = $ constant
3.) $k = $ spring constant $= .05$ to $.03$
4.) $\delta = $ drag coefficient $= .1$ to $.7$
5.) $\theta'' = -k_1\theta_{(n-1)} - \delta_1\theta'_{(n-1)}$
6.) $\Psi'' = -k_2\Psi_{(n-1)} - \delta_2\Psi_{(n-1)}$
7.) $\rho'' = -k_3\rho_{(n-1)} - \delta_3\rho'_{(n-1)}$
8.) $\phi'' = -k_4\phi_{(n-1)} - \delta_4\phi_{(n-1)}$
9.) $\theta'_n = \theta'_{(n-1)} + \theta''_n$
10.) $\Psi'_n = \Psi'_{(n-1)} + \Psi''_n$
11.) $\rho'_n = \rho'_{(n-1)} + \rho''_n$
12.) $\phi'_n = \phi'_{(n-1)} + \phi''_n$
13.) $\Psi''_s = k_s\Psi_s - \delta_2\Psi'_s$
14.) $\phi''_s = -k_s\phi_s - \delta_s\phi'_s$
15.) $\theta''_s = -k_s\theta_s - \delta_s\theta'_s$
16.) $\phi''_e = -k_e\phi_e - \delta_e\phi'_e$
17.) $\phi''_w = -k_w\phi_w - \delta_w\phi'_w$
18.) $\Psi''_w = -k_w\Psi_w - \delta_w\Psi'_w$
19.) $K_1^2/\delta_1 = .004$ to $.9$
   $K_2^2/\delta_2 = .004$ to $.9$
   $K_3^2/\delta_3 = .004$ to $.9$
   $K_4^2/\delta_4 = .004$ to $.9$
   $K_5^2/\delta_5 = .004$ to $.9$
   $K_6^2/\delta_6 = .004$ to $.9$
   $K_w^2/\delta_w = .004$ to $.9$
20.) $\Psi'_{s(n)} = \Psi'_{s(n-1)} + \Psi''_{sn}$
21.) $\phi'_{s(n)} = \phi'_{s(n-1)} + \phi''_{sn}$
22.) $\theta'_{s(n)} = \theta'_{s(n-1)} + \theta''_{sn}$
23.) $\phi'_{e(n)} = \phi'_{e(n-1)} + \phi''_{en}$
24.) $\Psi'_{w(n)} = \Psi'_{w(n-1)} + \Psi''_{wn}$
25.) $\phi'_{w(n)} = \phi'_{w(n-1)} + \Psi''_{wn}$
26.) $\theta'_n = \theta_{(n-1)} + \theta'_n$
27.) $\Psi_n = \Psi_{(n-1)} + \Psi'_n$
28.) $\rho_n = \rho_{n-1} + \rho_n$
29.) $\theta_n = \theta_{n-1} + \theta'_n$
31.) $\phi_{s(n)} = \phi_{s(n-1)} + \phi'_{s(n)}$
32.) $\theta_{s(n)} = \theta_{s(n-1)} + \theta'_{s(n)}$
33.) $\phi_{e(n)} = \phi_{e(n-1)} + \phi'_{e(n)}$
34.) $\phi_{w(n)} = \phi_{w(n-1)} + \phi'_{w(n)}$
35.) $\Psi_{w(n)} = \Psi_{w(n-1)} + \Psi'_{w(n)}$.

FIGS. 2a–2e represent a time sequence of frames of a display in which an element 21 is joined to a target element 23 at a joint 25 by a representation of a spring 27. A dash pot 31 provides damping of the movement of element 21. These figures illustrate the behavior of a single actuator overtime. An appreciation of the invention may be more readily understood by utilizing FIG. 3 in conjunction with Equations 1 of the Table of Equations and FIG. 2a–2e.

Figure 3:
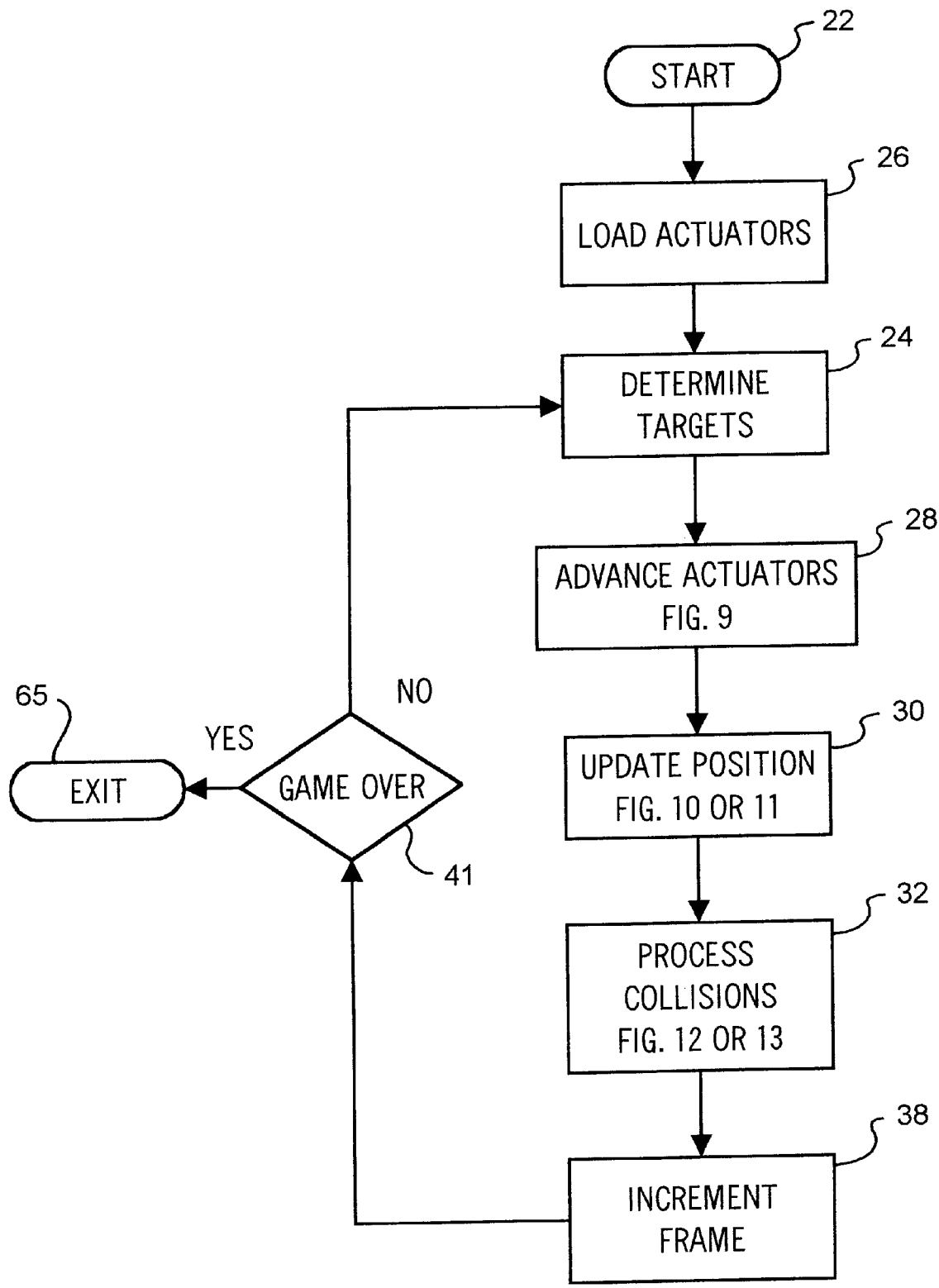
FIG. 3 is a flow diagram of the embodiments of FIGS. 6 through 8.

Referring to FIG. 3, at the start 22, the image displayed on the display 45 will be that of FIG. 1 through 3. In FIG. 3 at block 26, the actuators are bound by setting parameters for k and δ. The minimum and maximum values for each actuator are also set. An initial value is chosen for each actuator target and the positions x of each actuator are set equal to their targets, and their velocities ($x^1$) are set to zero. Determined target block 24 represents the setting the target by operator inputs via terminal 73 or by executing movements saved in RAM 42 is represented in FIG. 2b by the relocation of target element 23.

Figure 9:
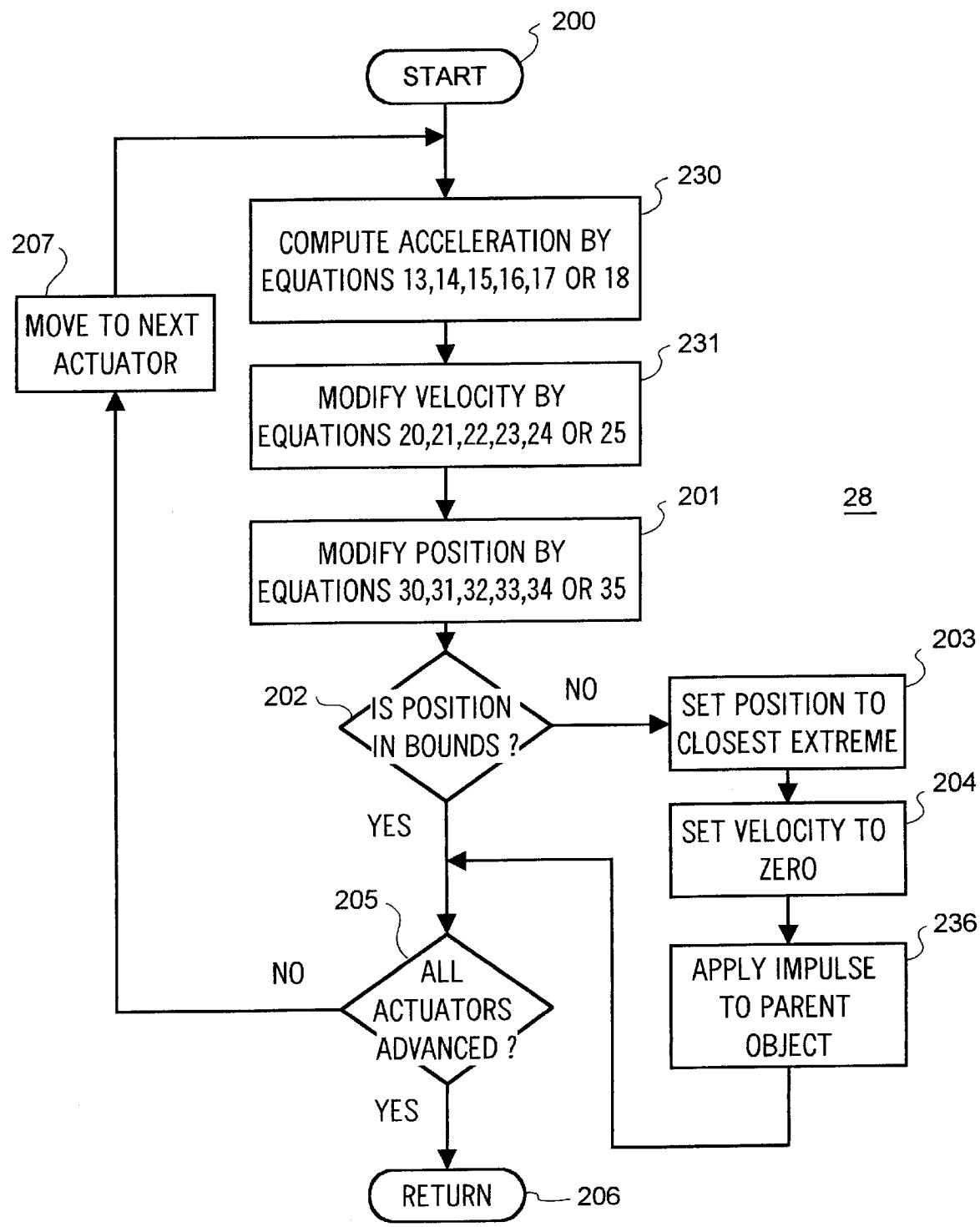
FIG. 9 is a flow diagram of the advancement of the actuator of the embodiment of FIG. 3.

Referring back to FIG. 3, the actuators are advanced at block 28. At block 28 the subroutine that is described in FIG. 9 is initiated. At block 28, the Equations 1 are solved and the position is updated at block 30. At block 30, the position of the element 21 is updated by finding the solutions to the Equations 1 by executing the flow that is indicated in the flow chart illustrated in FIG. 10 or 11.

After the position is updated, the collision process is executed at block 32. This process is described in FIG. 12. Following the collision process at block 32, the frame is incremented at block 38 and the system returns to determine the target at block 24.

Referring back at FIG. 2c (the third frame), the element 21 starts to move very rapidly as indicated by force lines 13 towards the target element 23. At FIG. 2d (the fourth frame) the element 21 has overshot the target position as it reaches position 46. Finally, at FIG. 2e (the fifth frame), the element 21 has come to rest at position 44 which is in the rest state and remains there until the target element 23 is again relocated. The process is repeated until decision block 41 detects that the game is over and exits at block 65.

For a game to be realistic, the movement of the mass 21 must be realistic. The movements must be more than a blur. With the teachings of the current invention, it has been found that by simulating the movement through the use of differential equations such as that of a spring, mass and dash pot represented by Equation 1 on the Table of Equations. The movement can be made to be very realistic.

Figure 4:
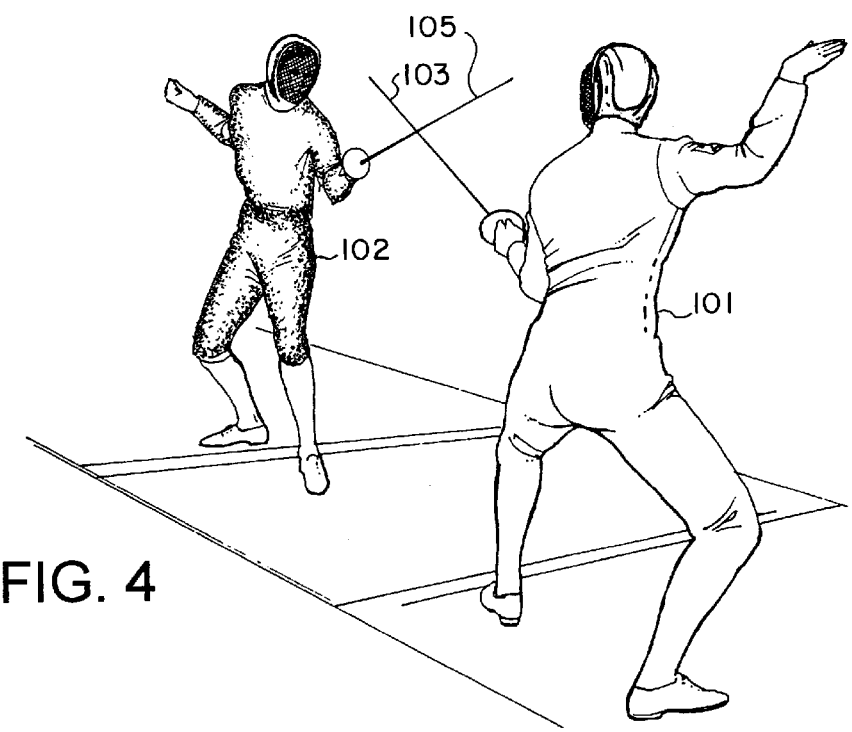
FIG. 4 is a diagram of two figures positioned for a sword fight.

FIG. 4 illustrates a game, a sword fight between players, 101 and 102. Each player has a sword, 103 and 105 respectively, clutched in their hands. The players are positioned to engage in a sword fight. The operator who controls the player 101, selects as a target, player 102 through the input terminal 73, initiates a swing to the target player 102. Simultaneously, either a second operator or a program stored in the game memory 63 detects this movement and causes player 102 to position his sword 105 to block the sword 103. This occurs in FIG. 5.

Figure 5:
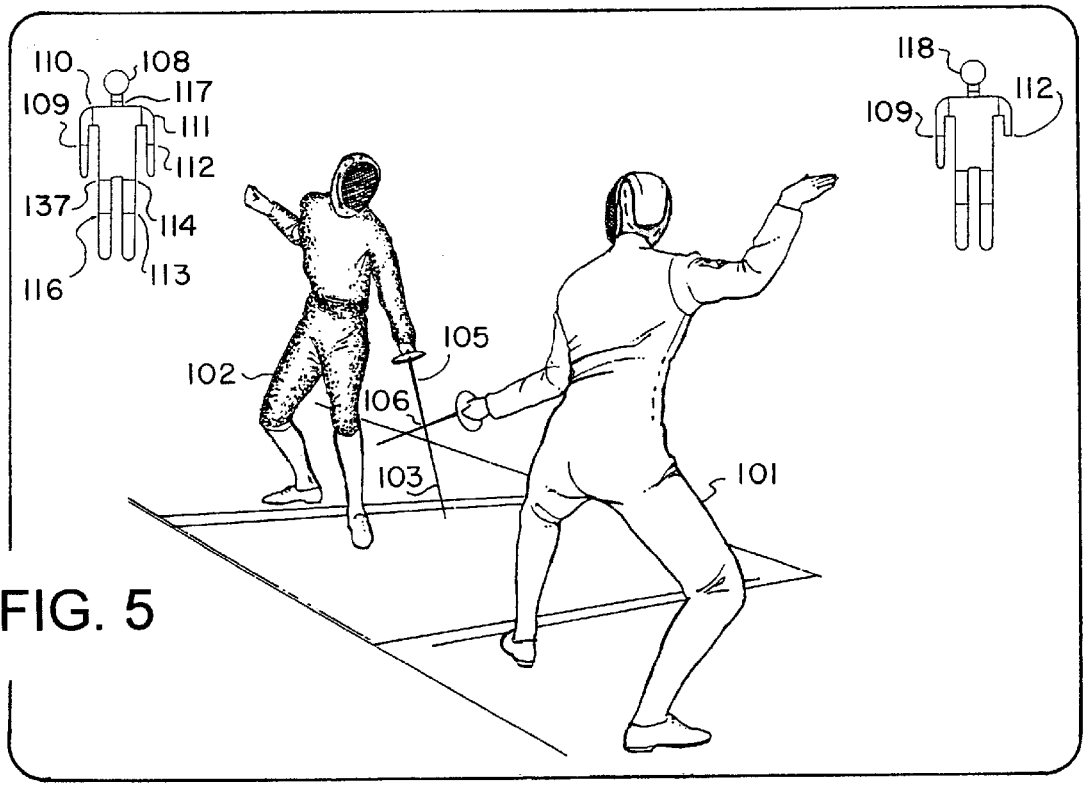
FIG. 5 is a second diagram of two figures engaged in a sword fight.
Figure 12:
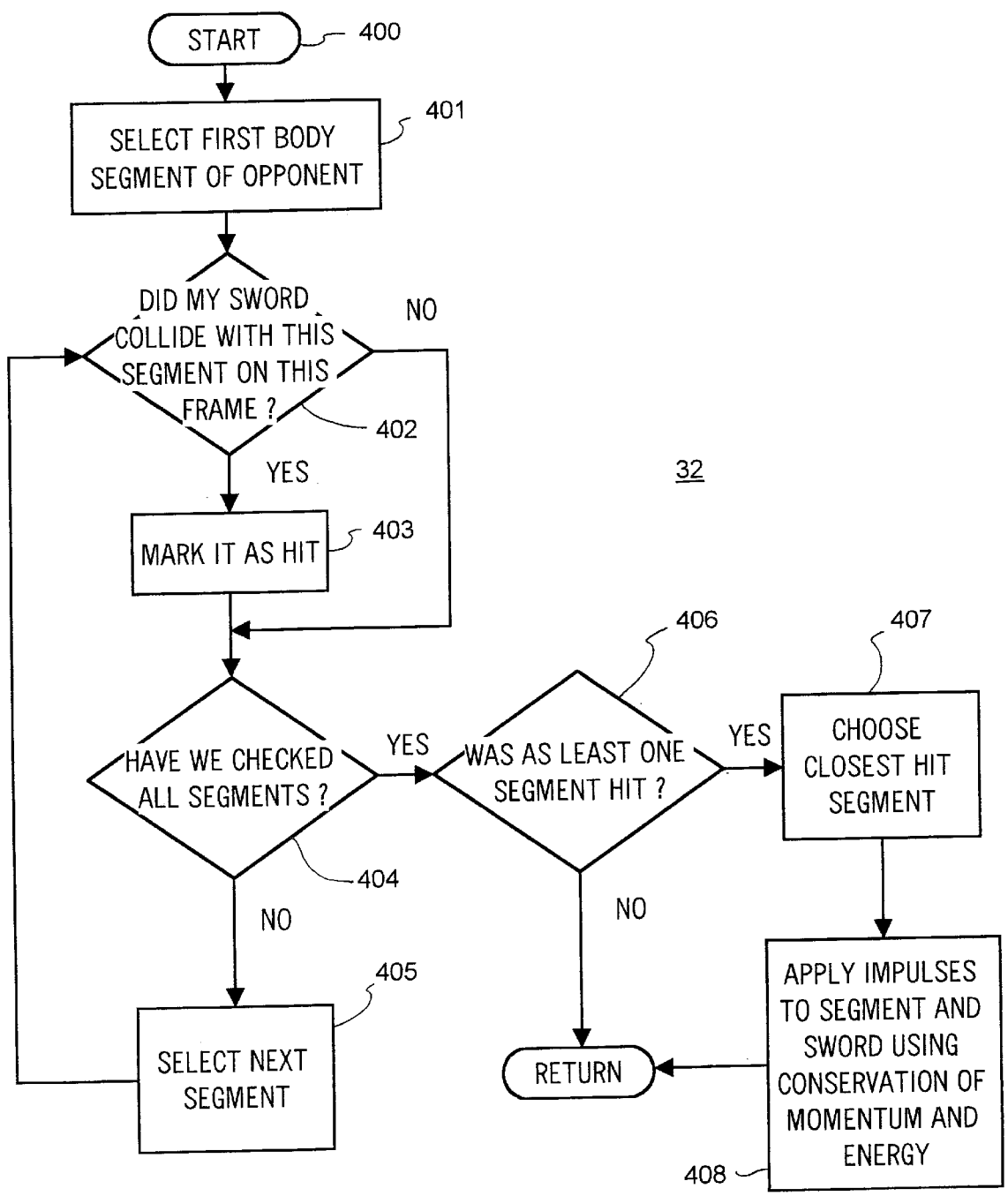
FIG. 12 is a flow diagram of the update of score images of FIG. 5.

In FIG. 5, the swords contact each other at point 106. In the prior art, the reaction of the two swords would have been shown as a blur or a prerendered animation sequence rather than a more realistic, human-like movement. Whereas the sequences followed in FIG. 12 provide a reaction to the collision according to physical principals.

Each figure includes a score keeper such as left score keeper 108 and for player 102, right score keeper 118 for player 112. When an injury occurs, then at segments 109 through 117, the injured portion is deleted from the image. For example, score keeper 118 has lost the lower potion of the arm at segment 112.

Figure 6:
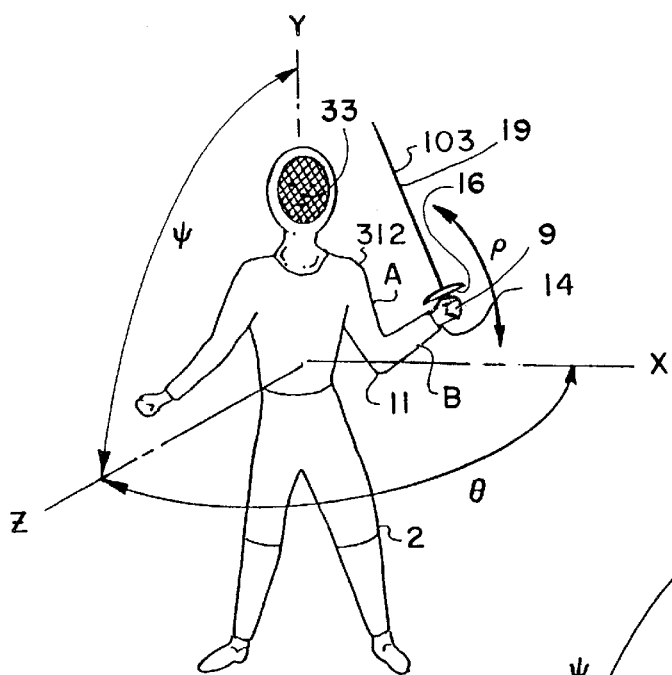
FIG. 6 is a simplified diagram showing the placement of the actuators according to the invention.

In FIG. 6, there is shown an image 2 of a player located at the origin of a cartesian three dimensional space. This allows the image shown on the display 55 to be three-dimensional. There are 3 actuators utilized in the embodiment of FIG. 6. An actuator is defined as a simulation of the solution of a differential equation for movement in a particular plane or along a ray or line. As discussed earlier, Equations 1, in the Table of Equations, show the solution for the simulation of a solution in a generic variable X. It has been found that the ratio of $k^2$ to $\delta$ must be roughly constant for a given character of motion. The particular range of values for k and $\delta$ are defined by Equations 3 and 4.

In the embodiment of FIG. 6, the three actuators are defined by Equations 5, 6 and 7. In Equation 7, $\rho$ represents the movement of the elbow joint 11 and wrist joint 14 and relates a position of the sword 103 to the shoulder 12. Additionally, there is movement provided in the $\theta$ and $\Psi$ planes. In particular, $\rho$ is used to define the position of the base 16 of the sword in relation to the shoulder 12. The position values $\theta$, $\psi$ and $\rho$ and the velocity values $\theta^1$, $\psi^1$ and $\rho^1$ are the input initial values or the values from the preceding frame.

What makes the use of actuators unique is that the computer does not actually solve the differential equations but simulates their solution. For example, the differential equation of motion for $\theta$ is given by Equation 5 and the velocity is provided by Equation 9 which is the summation of the velocity of the previous frame and acceleration of the current frame for any given frame. The position is provided by Equation 26 which is the summation of the position of the previous frame with the velocity of the current frame.

In order to position the elbow joint 11 in the proper position for an elbow, heuristic routine must be used. Once the position of the sword base 16 is determined, the position of the elbow joint 11 is constrained to a circle in space centered around the shoulder 12. The elbow joint 11 position is then defined as the intersection of the circle and the plane formed by the characters' nose 33, shoulder 12 and base 16 of his sword 103.

The angle of the sword 103 to the forearm 6 is also determined by the following heuristic.

If the base 16 of the sword 103 or hand 9 has reached its target position, it is aligned with the vector sum of the vector from the elbow joint 11 to the hand or, in the case of FIG. 6, the base 16 of sword 103 and one half the vector from the elbow joint 11 to the shoulder 12. If the base 16 of the sword 103 is en route to its target, it attempts to align its blade edge 19 with its direction of motion.

Figure 7:
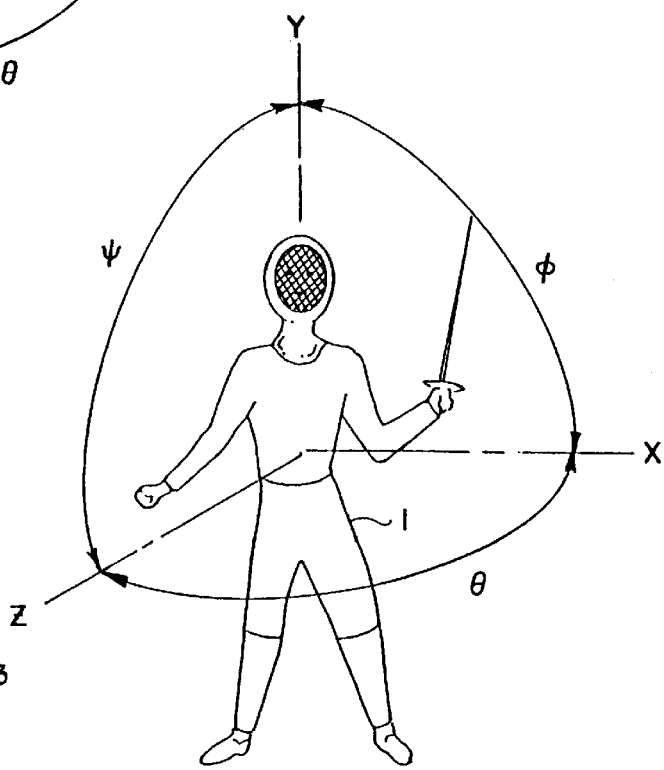
FIG. 7 is a simplified diagram illustrating the different planes of movement according to the invention.

FIG. 7 illustrates an alternate embodiment of the invention wherein there are three different planes of movement that are used in the implementation of this invention. An image is centered around the XYZ coordinates of FIG. 7. The three planes are identified by the following coordinates: a $\phi$ coordinate in the XY plane, a $\Psi$ coordinate in the ZY plane and a $\theta$ coordinate in the XZ plane.

Figure 8:
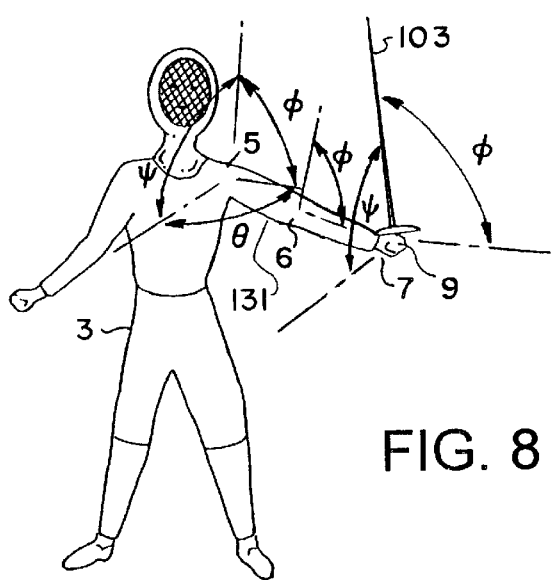
FIG. 8 is an alternate embodiment of the invention showing the placement of the actuators.

FIG. 8 is an example of the alternate embodiment of the invention wherein a more realistic movement is achieved over that illustrated in FIG. 6 by the additions of more actuators thereby eliminating the need to use elbow-heuristic to position the elbow. For example, the image 3 of FIG. 8 has a shoulder joint 5, an elbow joint 6 and a wrist joint 7. The shoulder joint 5 is capable of moving in all three planes defined in FIG. 7 whereas the joint 6 can only move in the $\phi$ plane and the joint 7 can move in the $\Psi$ and $\phi$ planes. It is obvious that joint 5 is used to represent the shoulder of an image whereas joint 6 is represented as the elbow and joint 7 is used to represent the wrist. Equations 13, 14 and 15 represent the equations of motion for the joint 5. Equation 16 represents the equation of motion for joint 6. Equations 17 and 18 represent the equations of motion for the joint 7. The velocity value for each one of these joints is provided by equations 20 through 25. The positions by Equations 30 through 35. In equations 13 through 18, the values for velocity and position are values from the previous frame or input initial values.

In the embodiment of FIG. 8, the image 3 has a sword 103 and as was discussed earlier, there are 6 actuators $\phi_s$, $\Psi_s$, $\theta_s$ (which are associated with the joint 5), $\phi_c$ (which is associated with joint 6) and $\phi w$ and $\Psi_w$ (which are associated with the joint 7) controlling the movement of the sword 103. The execution of the program for FIG. 8 is discussed in conjunction with FIG. 9.

Referring to FIG. 9 which should be used in conjunction with FIGS. 3 and 5, the imaging system 100 of FIG. 1 is designed to cause the display 55 to display a sequence of frames. The sequence of frames begins with frame 1 and runs on as long as the computer is operating the program display of FIG. 5. In the case of FIGS. 3 and 9, the first task at block 22 is to start the process followed by the loading of the actuators at block 26 and the placement of the target for the first frame at block 24. This process is begun by an operator initiating of a game in the game memory at block 22. Following the determination of the target at block 24, the actuators are advanced at block 28 after which the position of an image such as that shown in FIGS. 4 and 5 is updated at block 30.

The advancing of the actuators at block 28 is illustrated in FIG. 9 to which reference should now be made. Following the determination of the targets at block 24, the execution of the program will proceed to the start 200 where for each actuator, this routine is executed. At block 230, the acceleration is computed by Equations 13, 14, 15, 16, 17 or 18 depending on which actuator the acceleration is being determined. Following the computation of the acceleration, then the modification of the velocity occurs at block 231. The modification of the velocity is performed by the execution of one of the following equations from the Table of Equations—Equations 20, 21, 22, 23, 24 or 25. After the modification of the velocity has occurred, there is enough data available to modify the position of the base of the sword 16. Modification of the position of the joint to which the particular actuator is associated with and the program is being executed occurs at block 201 wherein one of the following equations from the Table of Equations is executed. These equations are Equations 30,31, 32, 33, 34 or 35. At decision block 202, a check is made to make sure that the particular joint that is being executed is in bounds. If it is not, then at block 232 the position is set to the closest extreme that was part of the parameters that were set during the load of the actuator at block 203. At block 204, the velocity is then set to zero and the routine proceeds to block 302. There is an impulse representing the force of the actuator lifting one of the extreme bounds on its motion applied to the parent object. By parent object, we mean the actuator controlling the joint which governs the movement of the next closer element of the arm to the body has an actuator. For example, referring to FIG. 8, the hand 7 parent is the elbow 6 and the parent to the elbow 6 is the shoulder 5. Following the application of the impulse to the parent object at block 236; we proceed to verity that all of the actuators have been advanced at decision block 205. If not, the routine goes to block 207 which increments to the next actuator. For example, if the previous set of executions had been to sequentially execute Equation 13, 20 and 30, at the move to the next actuator, then Equations 14, 21 and 31 would be executed until all of the equations have been executed or solved.

When the final actuator needed to apply an impulse to its parent has no parent so it applies that impulse directly to the body of the character 3 and the final parent in this case is the shoulder 5.

It is obvious in the case of FIG. 6 that the same program can be used except the equations that are to be solved are Equations 5, 6 and 7 for acceleration; Equations 9, 10 and 11 are used to modify the velocity; Equations 26, 27 and 28 would be used to modify positions.

Figure 10:
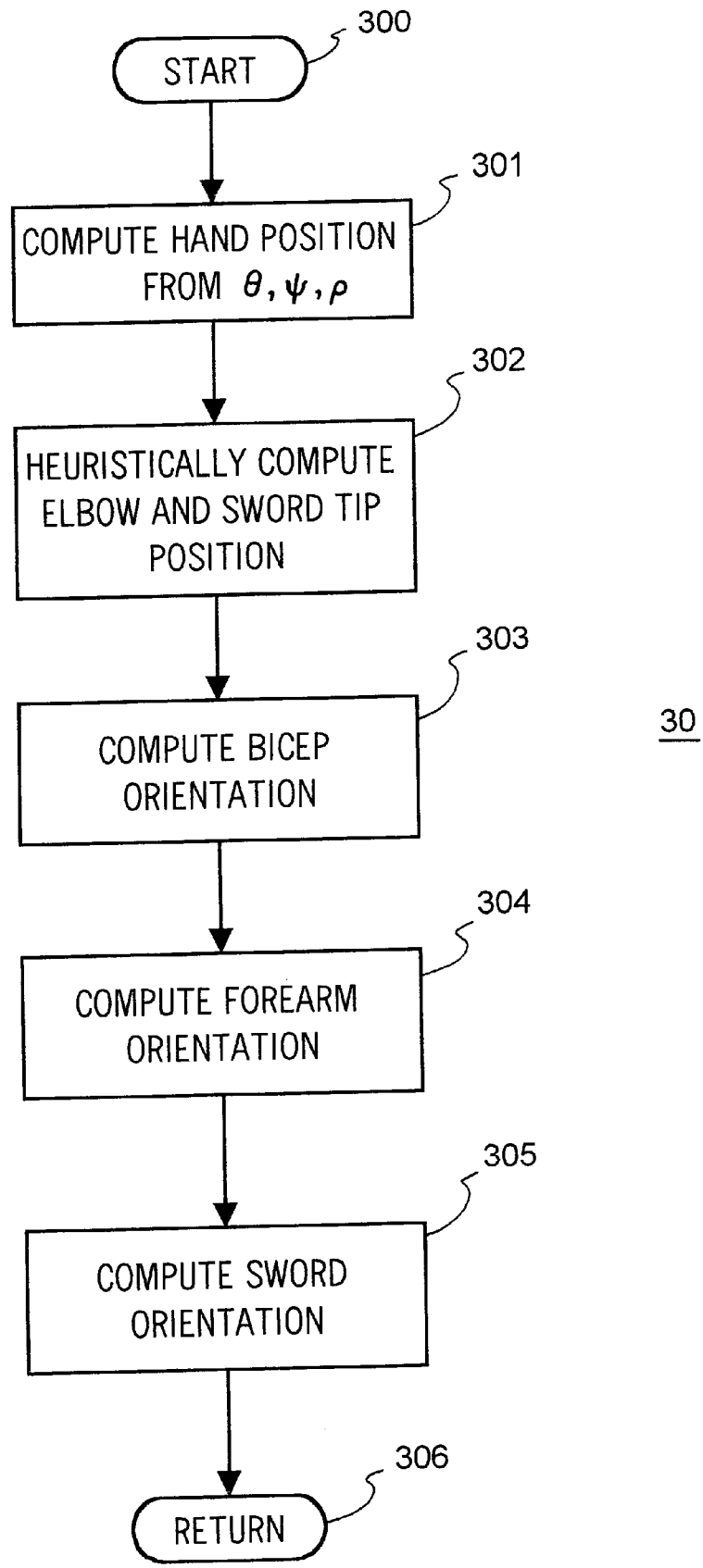
FIG. 10 is a flow diagram of the update of the position of the embodiment of FIG. 3.

FIG. 10 is a flow diagram that illustrates the execution of the block 30 of FIG. 3 which is to update the positions of the arm segments based upon the actuator values. At start block 300, the update positions are begun and the position of the base of the sword 16 is determined from θ, Ψ and ρ at block 301. At block 302, the computer heuristically computes the elbow and sword tips' position as was previous discussed and then proceeds to compute the bicep orientation at block 303 following which the forearm orientation is computed at block 304 and following which the sword orientation is computed at block 303 and then returned to execute block 32 at return segment 300.

Figure 11:
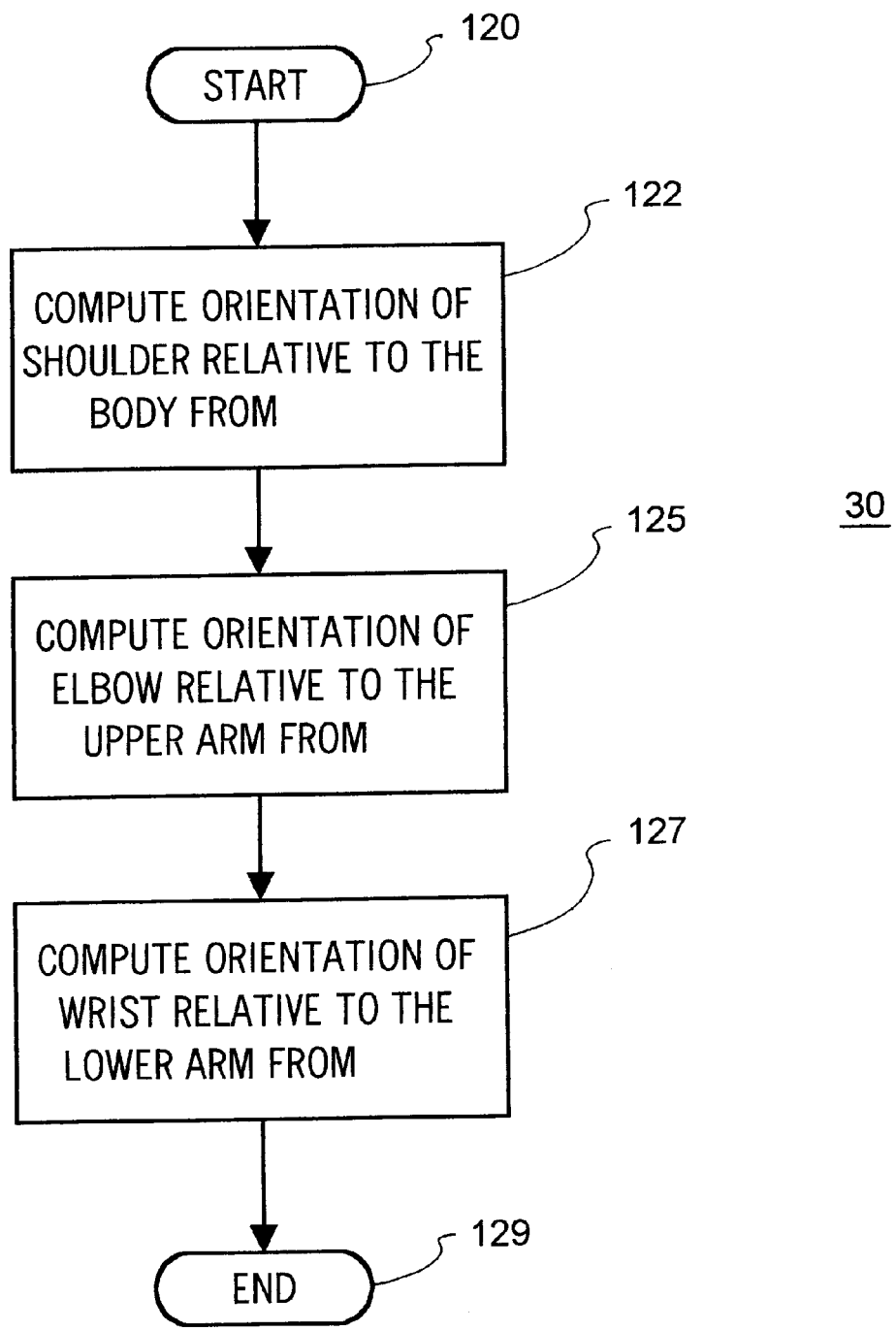
FIG. 11 is a flow diagram of an alternate embodiment of FIG. 8.

The embodiment of FIG. 8, when implemented, follows a flow chart described in FIG. 11 to which reference should now be made. Following the start position 120, the orientation of the shoulder 5 relative to the body is computed from the $\theta_S$, $\phi_S$ and $\Psi_S$. It is computed in the following manner. First the shoulder is rotated in the X Z plane by an angle of $\theta_S$ whose value is computed from Equation 32 of the Table of Equations. The shoulder is then rotated in the XY plane by a value of $\phi_S$ whose value is also computed by Equation 31 of the Table of Equations. Then the shoulder is rotated in the YZ plane by a value of $\Psi_S$ whose value is also computed from Equation 27 of the Table of Equations. We next embark to block 125 to compute the orientation of the elbow relative to the upper arm from $\phi_E$. This orientation is computed by rotating the elbow to an angle of $\phi_E$ in the XY plane. Again, the value of $\phi_E$ is computed from Equation 33 of the Table of Equations. Finally, in block 127, the orientation of the wrist is computed relative to the lower arm from $\phi_w$ and $\Psi_w$. $\Psi_w$ represents rotation of the wrist to an angle of the value $\Psi_w$ in the YZ plane. $\phi_w$ represents rotation of the wrist to the value of $\phi_w$ in the XY plane. Again, these values are computed from Equations 34 and 35 of the Table of Equations. This concludes the process of updating the position of the sword arm in the second implementation.

FIG. 12, illustrates the process collisions subroutine that is executed at block 32 of FIG. 3. The start position occurs at block 400 where the at the first step it selects the first body segment of the component at block 401. At block 402 the question is asked "Did my sword collide with this segment on this frame?" If the answer is "no" we proceed to block 404 and if "yes" we proceed to mark it as a hit at block 403. By "hit" we mean that the sword intersected the given body segment of the opponent on this frame such as in FIG. 5 wherein the opponents body segments are numbered 110, 109, 108, 117, etc. Then we proceed to the following question in block 404 "Have we checked all of the segment of the opponents body?" If the answer is "no" we proceed to block 405 where we select the next segment of the opponent and then we proceed back up to block 402 and ask again the question "Did my sword collide with this segment on this frame?"

Once we arrive at block 404 and the answer to the question "save we checked all segments?" is "yes", we then proceed to block 406. At block 406 we ask the question "Was at least one segment on the opponent's body struck by the sword?" If the answer is "no", we exit the collision process. If the answer is "yes", we proceed to block 407. At block 407, we go through all of the body of segments of the opponents that were struck by the sword and chose the one closest to the sword's original starting position. This is the body segment that we will consider the sword to have struck on this frame. We then proceed to block 408 wherein we apply impulses to the segment that was struck and to the sword using conservation of momentum and conservation of energy and then we exit the collision process.

Figure 13:
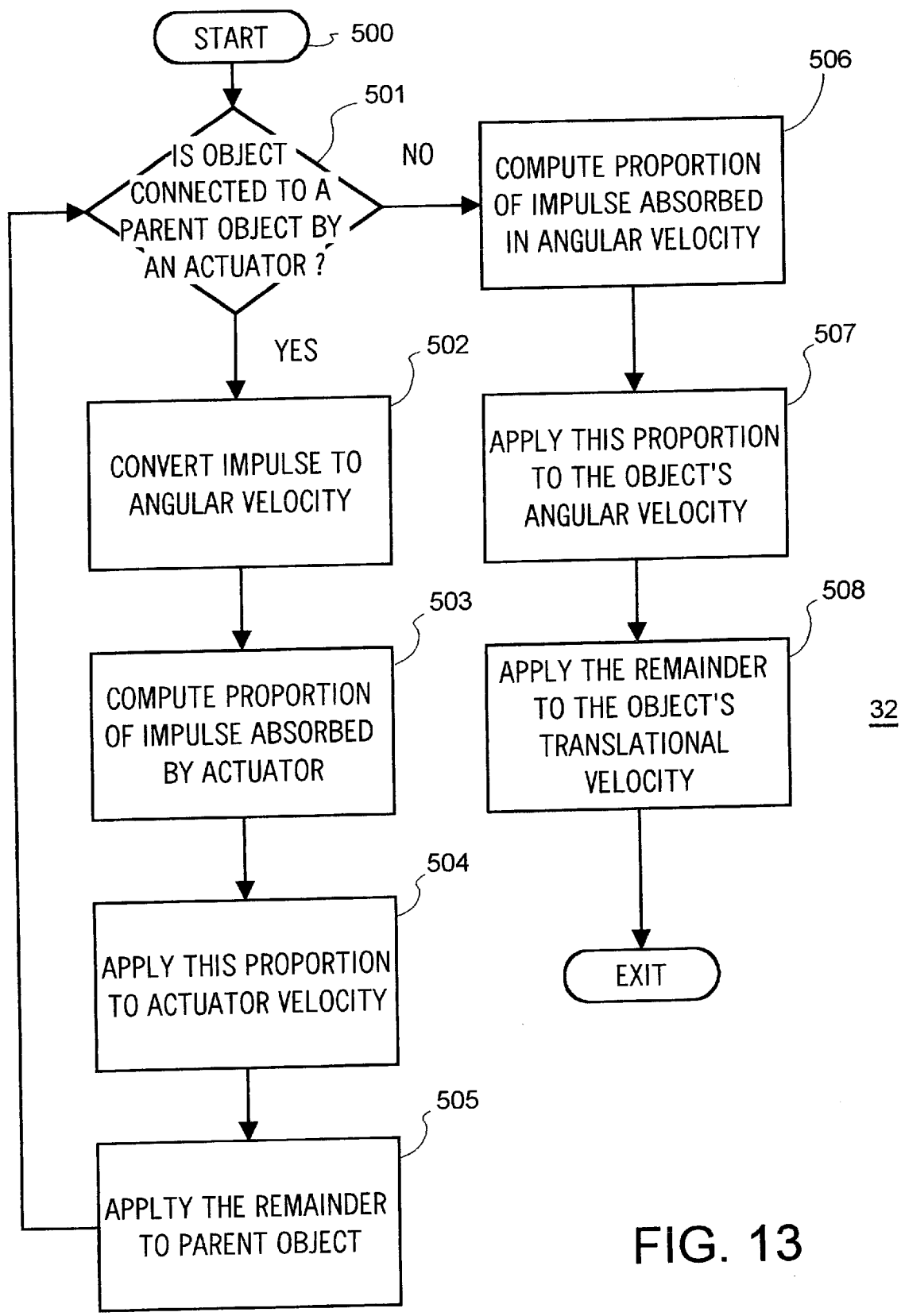
FIG. 13 is a flow diagram of the processing collisions of the embodiment of FIG. 3.

In the discussions of the previous embodiment (block 32 of FIG. 9), every time an apply impulse is described, it refers to the following routine of FIG. 13 is executed. The procedure for applying an impulse to an object begins at block 500. The execution then proceeds to block 501 where the question is asked "Is the object connected to a parent object by an actuator?" If the answer is "yes", then in block 502, the impulse is converted into angular velocity. Execution then proceeds to block 503 where the proportion of the impulse absorbed by the actuator is computed. Then execution proceeds to block 504 where this proportion of the impulse is applied to the angular velocity of the actuator. Then in block 505, the remaining impulse is applied to the parent object of the actuator. This then sends execution back to block 501 where the same question is now asked about the parent object—"Is this object connected to a parent object by an actuator?" This process is repeated until the answer to the question in block 501 is "no". Execution then proceeds to block 506. In block 506, again the proportion of the impulse absorbed in angular velocity of the actuator is computed. Then in block 507, the proportion of the impulse is applied to the object's angular velocity. Then execution proceeds to block 508 where the remainder of the impulse is applied to the figure's body. This concludes the algorithm for applying an impulse to an object.

Figure 14:
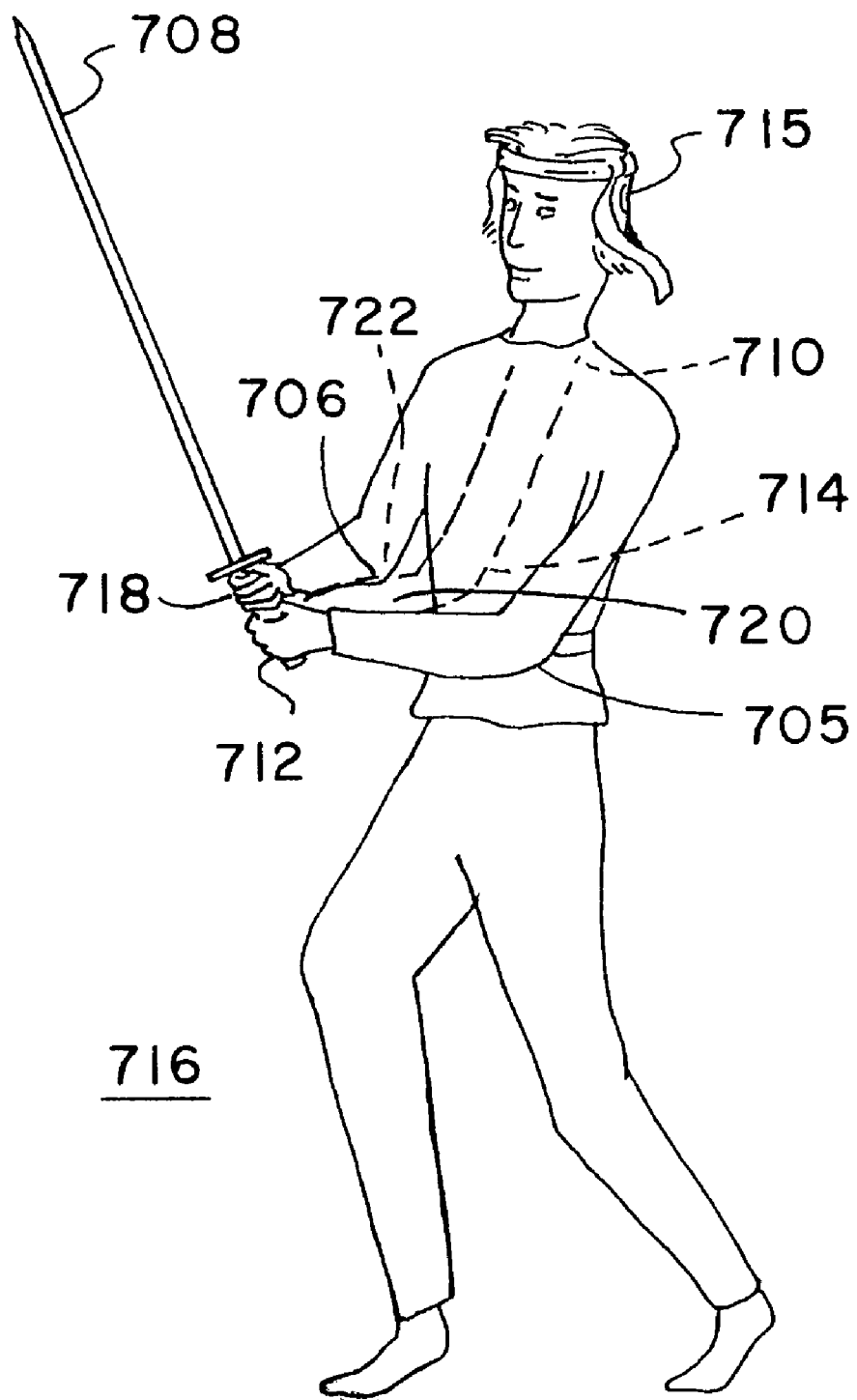
FIG. 14 is an embodiment of the use of a two hand sword image according to the invention.

There are situations wherein an weapon or an object is grasped with two hands. In this situation, the embodiment of FIG. 12 is used. The embodiment of FIG. 14 includes an image 716 that has a sword 708 held by his left arm at his hand 718 and by his right arm 705 at the right hand 712. In order to provide realistic movements, it has been found that the regular arms ought to be used for display of the image only and the actual position of the sword 708 be determined by the use of a third, invisible arm 714. The invisible arm 714 connects the neck region of the image 716 to the union of the hands 712 and 718 and has, in the preferred embodiments, three joints 720, 722 and 710. In this embodiment of FIG. 14, acceleration is determined by equations 13 through 18 and velocity is determined by equations 20 to 25 and position is determined by equations 30 through 35. The only difference is that the shoulder is directly under the head of 715 of the image 716 rather than in the usual position as shown in FIGS. 4 and 5. In this two-handed implementation, once the invisible third arm's position has been determined, the two actual visible arms are now placed so that both of their hands grasp the same location which is where the base of the sword is as attached to the invisible arm. The elbows of the left and right arm are determined in their position by the same elbow heuristic which is used in the first embodiment as previously described.

Figure 15:
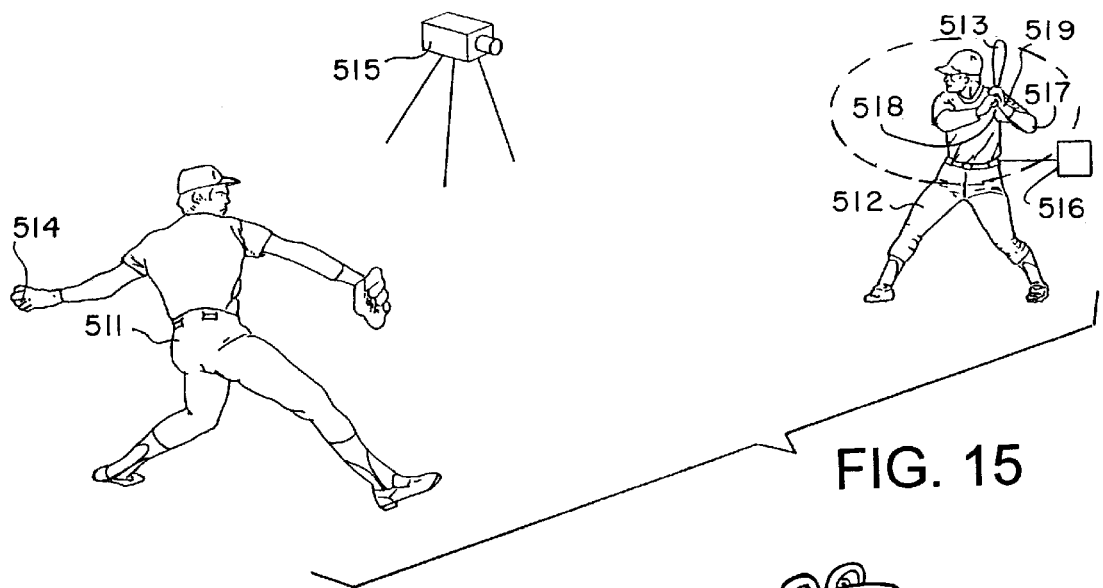
FIG. 15 is an illustration of a computer simulator playback system.

FIG. 15, to which reference should now be made, shows an illustration of a computer simulated playback system of two players 511 and 512. Player 512 holds a bat and is a target for player 511 to throw a ball 514. In actuality, the players 501 and 502 represent actual figures that are being videoed by the camera 515. Player 512 has a sensor terminal 516 which monitors the sensors if 517, 518 and 519 that are related to the video film made by the camera 515 and correspond to joints 5, 6 and 7 of FIG. 8. The data and information that result from this procedure is stored and can be read back via the game memory 63 and displayed on the display 55. An operator, at the terminal 73, may apply the actuators defined in the Table of Equations to the image of player 512 that is shown on the display 55 at block 24 of FIG. 3. In order to adjust and apply the actuators in this manner, the positional data of a baseball player's swing and pitch must first be converted into target data for the actuators of the joints. This procedure would involve a frame by frame reverse engineering of the positional data of the baseball player and for the pitcher wherein at each frame the computer would determine which targets were necessary for the actuators to produce the movement that was recorded. The advantage by applying actuators to the embodiments of FIG. 15 is that the movement character of player 512 can be modified by varying the constants (k) and ($\delta$) and the targets through the input terminal 73, the figure displayed in 512 can be very agile, if (k) is large or very lethargic if (k) is a small number. The only requirement is that the ratio of the spring constant ($k^2$) to the drag coefficient ($\delta$) be roughly equal to a constant number for a given quality of movement. But by varying these numbers, the display of the figure in the display 55 can be made agile or lethargic simply by varying the size of the constant (k). The data can be stored in the memory 42 or recorded 55a or in a ROM 55b for playback at a later date.

Figure 16:
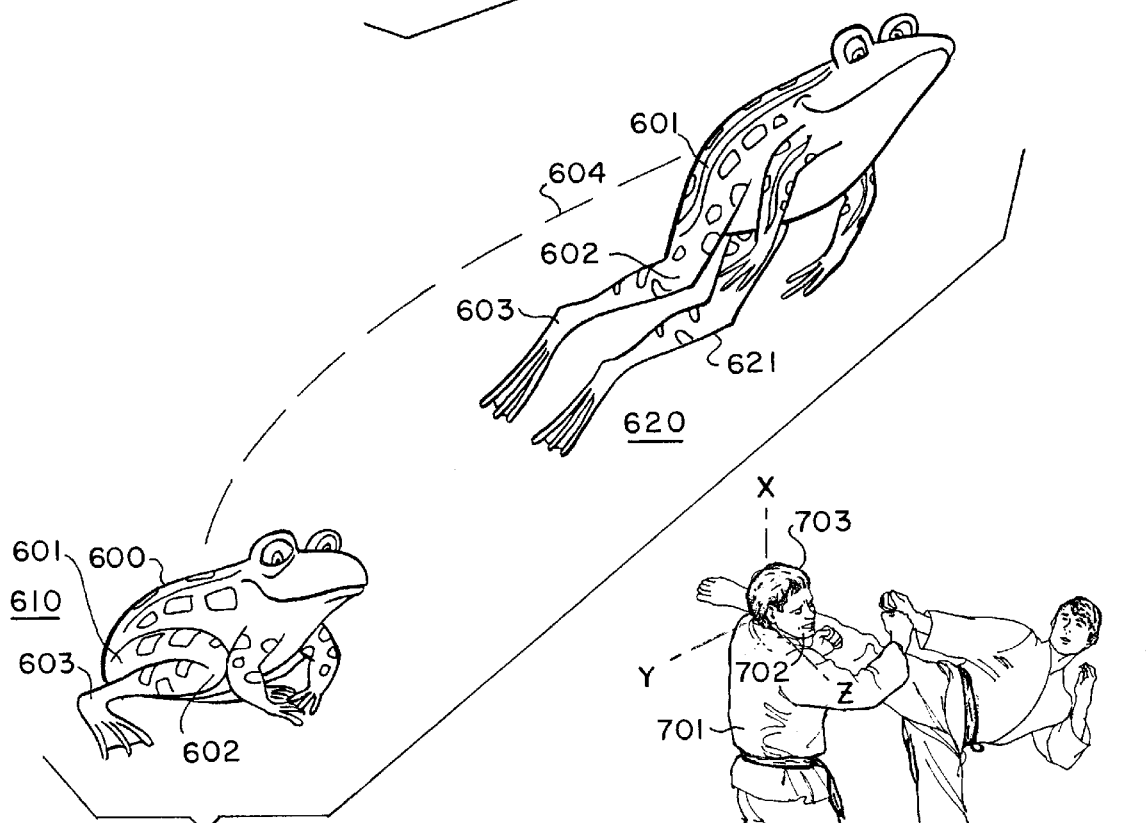
FIGS. 16 and 17 are other examples of the use of actuators to create realistic moves of action figures.

Other examples of the use of the actuators to create realistic movements on a display 55 are shown in FIG. 16 in which frog 600 is initially shown in a sitting position at point 610 and has three joints defined by 601, 602 and 603. At position 620, the frog is in the midst of a leap represented by the dotted line 604 in which the illustration of a leg 621 is extended showing the joints 601,602 and 603. From this operation the movements at each joint are represented by Equations 1 of the Table of Equations.

Figure 17:
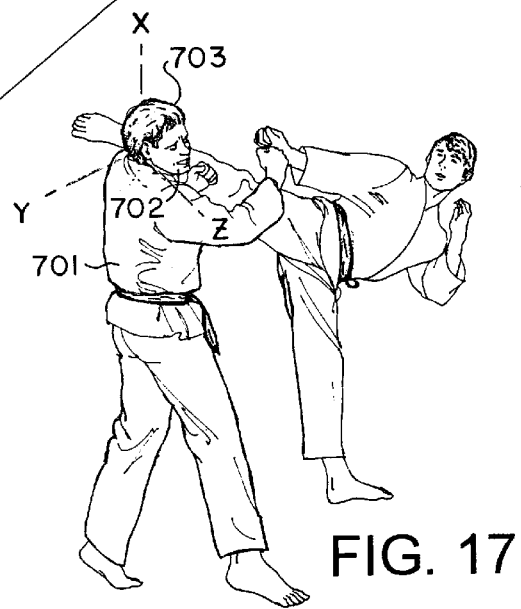

Similarly, the images in FIG. 17 show two kick boxers in which one boxer 701 has been struck on the representation of his chin 702 and, of course, would have similar degrees of movement of that shown in FIG. 7 so that the Equations 6 and 8 for $\theta$ and $\Psi$ can be used to represent the movement of the figure's 701 head 203.

I claim:

1. An imaging system comprising:
    a computing apparatus including a memory apparatus having an imaging program stored therein, a display apparatus and an input terminal, the computing apparatus being operably connected to the input terminal and the display apparatus; and wherein the display apparatus displays an image generated by the computing apparatus executing the program stored in the memory apparatus and including a means for generating a sequence of frames, the image includes a moveable figure having a first and second element connected together at a first union and wherein at least the second element moves in response to inputs provided by the input terminal via the computing apparatus and wherein the computing apparatus in response to an input from the input terminal includes a virtual actuator means for defining the movement in a first plane of the second element according to a first simulation of the solution for a first equation of motion for a damped oscillator, the first equation of motion defines a first change in position of the second element in the first plane of each frame of the sequence of frames and includes a first acceleration value equal to a negative first predetermined constant times a first position value representing a displacement from a target of the second element minus a second predetermined constant times a first velocity value wherein the first velocity value is defined as the rate of change in the displacement of the second element in the first plane between frames.

2. The imaging system according to claim 1 wherein the first velocity value further comprises: the sum of the first velocity value of a previous frame plus the first acceleration value of the current frame.

3. The imaging system according to claim 2 wherein the first position value is equal the first position value of a previous frame plus the first velocity value of the current frame.

4. The imaging system according to claim 1 further including a means for generating a sequence of frames and wherein the second element has a variable length and further comprises:
    a second virtual actuator means for defining the length of the second element in a ray according to the second simulation of the solution for a second equation of motion for the damped oscillator.

5. The imaging system according to claim 4 wherein the second simulation of the solution of the second equation of motion defines a second change in length of the second element in the ray of each frame of the sequence of frames and the second equation of motion includes a second acceleration value as being equal to a negative third predetermined constant times a second position value representing a displacement of the length of the second element, minus a fourth predetermined constant times a second velocity value wherein the second velocity value is defined as the rate of change in the displacement of the length of the second element along the ray between frames.

6. The imaging system according to claim 5 wherein the second velocity value further comprises: the sum of the second velocity value of a previous frame plus the second acceleration value of the current frame.

7. The imaging system according to claim 6 wherein the second position value is equal the second position value of a previous frame plus the second velocity value of the current frame.

8. The imaging system, according to claim 5 wherein the first simulation of the solution for a first equation of motion defines a first change in position of the second element in the first plane of each frame of the sequence of frames and the first equation of motion comprises: a first acceleration value as being equal to a minus first predetermined constant times a first position value representing a displacement from a target of the second element minus a second predetermined constant times a first velocity value wherein the first velocity value is defined as the rate of change in the displacement of the second element in the first plane between frames and wherein the first predetermined constant is equal to the third predetermined constant and the second predetermined constant is equal to the fourth predetermined constant.

9. The imaging system according to claim 4 further comprising: a third virtual actuator means for controlling the movement of the second element at the union between the first and the second elements in a second plane according to a third simulation of the solution to a third equation of motion for the damped oscillator.

10. The imaging system according to claim 9 wherein the third simulation of the solution for the third equation of motion defines a third position of the second element in the second plane of each frame of the sequence of frames and the third equation of motion comprises: a third acceleration value as being equal to a negative fifth predetermined constant times a third position value representing the displacement of the second element, minus a sixth predetermined constant times a third velocity value wherein the third velocity value is defined as the rate of change in displacement of the second element between frames in the second plane.

11. The imaging system according to claim 10 wherein the third velocity value further comprises: the sum of the third velocity value of a previous frame plus the third acceleration value of the current frame.

12. The imaging system according to claim 11 wherein the third position value is equal the third position value of a previous frame plus the third velocity value of the current third frame.

13. The imaging system, according to claim 10 wherein the first predetermined constant is equal to the fifth predetermined constant and the second predetermined constant is equal to the sixth predetermined constant.

14. The imaging system according to claim 1 including a means for generating a sequence of frames and the imaging system further comprises:
  a second virtual actuator means for defining the movement of the second element at the union between the first and the second elements in a second plane according to a second simulation of the solution for a second equation of motion for the damped oscillator.

15. The imaging system according to claim 14 wherein the second simulation of the solution for a second equation of motion defines a second change in displacement of the second element in the second plane of each frame of the sequence of frames and the second equation of motion includes a second acceleration value as being equal to a minus third predetermined constant times a second position value representing the displacement of the second element in the second plane, minus a fourth predetermined constant times a second velocity value wherein the second velocity value is defined as the rate of change in displacement of the first element between frames in the second plane.

16. The imaging system according to claim 15 wherein the second velocity value further comprises: the sum of the second velocity value of a previous frame plus the second acceleration value of the current frame.

17. The imaging system according to claim 16 wherein the second position value is equal the second position value of a previous frame plus the second velocity value of the current frame.

18. The imaging system, according to claim 15 wherein the first predetermined constant is equal to the third predetermined constant and the second predetermined constant is equal to the fourth predetermined constant.

19. The imagining system according to claim 14 further comprising: a third virtual actuator means for defining the movement of the second element at the union between the first and the second elements in a third plane according to a third simulation of the solution for a third equation of motion for the damped oscillator.

20. The imagining system according to claim 19 wherein the third simulation of the solution for a third equation of motion defines a third position of the second element in the third plane of each frame of the sequence of frames and the third equation of motion comprises: a third acceleration value as being equal to a negative fifth predetermined constant times a third position value representing the displacement of the second element, minus a sixth predetermined constant times a third velocity value wherein the third velocity value is defined as the rate of change in displacement of the second element between frames in the third plane.

21. The imaging system according to claim 20 wherein the third velocity value further comprises: the sum of the third velocity value of a previous frame plus the third acceleration value of the current frame.

22. The imaging system according to claim 21 wherein the third position value is equal the third position value of a previous frame plus the third velocity value of the current frame.

23. The imaging system, according to claim 20 wherein the first predetermined constant is equal to the fifth predetermined constant and the second predetermined constant is equal to the sixth predetermined constant.

24. The imagining system according to claim 14 further comprising: a third element joined to the second element at a second union separated from the first union and including a fourth virtual actuator means for defining the movement of the second and third elements at the second union according to a fourth simulation of the solution for a fourth equation of motion for the damped oscillator.

25. The imagining system according to claim 24 wherein the fourth simulation of the solution for a fourth equation of motion defines a first change in displacement of the second and third elements in the first plane of each frame of the sequence of frames and the fourth equation of motion comprises: a fourth acceleration value as being equal to a negative seventh predetermined constant times a fourth position value representing the displacement of the first and third elements, minus a eighth predetermined constant times a fourth velocity value wherein the fourth velocity value is defined as the rate of change in displacement of the first and third elements in the first plane between frames.

26. The imaging system according to claim 25 wherein the fourth velocity value further comprises: the sum of the fourth velocity value of a previous frame plus the fourth acceleration value of the current frame.

27. The imaging system according to claim 26 wherein the fourth position value is equal the fourth position value of a previous frame plus the fourth velocity value of the current frame.

28. The imaging system, according to claim 25 wherein the first predetermined constant is equal to the seventh predetermined constant and the second predetermined constant is equal to the eight predetermined constant. frames in the first plane.

29. The imaging system according to claim 24 further comprising: a fourth element joined to the third element at a third union separated from the first and second unions and a fifth virtual actuator means for defining the movement of the third union according to a fifth simulation of the solution for a fifth equation of motion for the damped oscillator.

30. The imagining system according to claim 29 wherein the fifth simulation of the solution for a fifth equation of motion further defines a position of the second, third and fourth elements in the first plane of each frame-of the sequence of frames and the fifth equation of motion comprises: a fifth acceleration value as being equal to negative ninth predetermined constant times a fifth position value representing the displacement of the second, third and fourth elements, minus a tenth predetermined constant times a fifth velocity value wherein the fifth velocity value is defined as the rate of change in displacement of the second, third and fourth elements in relation to the first element between frames in the first plane.

31. The imaging system according to claim 30 wherein the fifth velocity value comprises: a sum of the fifth velocity value of a previous frame and the fifth acceleration of the current frame.

32. The imaging system according to claim 31 wherein the fourth position value is equal the fourth position value of a previous frame plus the fourth velocity value of the current frame.

33. The imaging system, according to claim 30 wherein the first predetermined constant is equal to the ninth predetermined constant and the second predetermined constant is equal to the tenth predetermined constant.

34. The imagining system according to claim 29 further comprising: a sixth virtual actuator means for defining the movement of the fourth element at the third union in the second plane according to the sixth simulation of the solution for a sixth equation of motion for the damped oscillator.

35. The imagining system according to claim 34 wherein the sixth simulation of solution for a sixth equation of motion defines a second change in displacement of the second, third and fourth elements in the second plane of each frame of the sequence of frames and the second equation of motion includes a sixth acceleration value as being equal to a negative eleventh predetermined constant times a sixth position value representing a change of displacement of the first, third and fourth elements, minus a twelfth predetermined constant times a sixth velocity value wherein the sixth velocity value is defined as the rate of change in displacement of the second, third and fourth elements between frames in the second frame.

36. The imagining system according to clam 35 wherein the sixth velocity value further comprises: the sum of the sixth velocity value of a previous frame plus the sixth acceleration value of the current frame.

37. The imagining system according to claim 36 wherein the sixth position value is equal the sixth position value of a previous frame plus the sixth velocity value of the current frame.

38. The imagining system, according to claim 35 wherein the first predetermined constant is equal to the eleventh predetermined constant and the second predetermined constant is equal to the twelfth predetermined constant.

39. A method of generating with a computer an image having a moveable figure comprising the steps of:
    displaying on a display a sequences of frames such that for each current frame there is a preceding frame with each frame illustrating the moveable figure having a first and second element connected together at a first union;
    identifying a target;
    advancing at least the second element towards the identified target for each frame of the sequence of frames;
    wherein the step of advancing at least the second element further comprises the step of advancing at least a first virtual actuator that defines the movement of the second element according to a first simulation of the solution for a first equation of motion for the damped oscillator in a first plane between a first preceding frame and a first current frame in the sequence of frames wherein for each frame the first simulation of the first equation of motion includes a first acceleration value, a first velocity value and a first position value and the step of advancing at least the first virtual actuator includes the steps of; simulating the solution of the first equation of motion of the damped oscillator for the first acceleration value, modifying the first velocity value according to the sum of the first velocity value of the preceding frame plus the first acceleration value of the current frame, and modifying the first position value according to the first position value of the preceding frame plus the first velocity value of the current frame.

40. The method according to claim 39 wherein the first and second elements have a first predefined boundary further comprising:
    verifying that the first position value is within the first predefined boundary; and
    adjusting the first position value when the first position value is not within the predefined boundary.

41. The method according to claim 40 wherein the step of adjusting the first position value further comprises:
    applying an impulse to the first element.

42. The method of generating an image according to claim 39 further comprising the steps of:
    advancing a second virtual actuator wherein the second virtual actuator defines the movement in a second plane of the second element according to a second simulation of the solution for a second equation of motion for the damped oscillator.

43. The method according to claim 42 wherein for each frame the second simulation of the solution for a second equation of motion includes a second acceleration value, a second velocity value and a second position value and the step of advancing the second virtual actuator includes the steps of:
    simulating the solution of the second equation of motion of the damped oscillator for the second acceleration value;
    modifying the second velocity value according to the sum of the second velocity value of the preceding frame plus the second acceleration value of the current frame; and
    modifying the second position value according to the second position value of the preceding frame plus the second velocity value of the current frame.

44. The method according to claim 43 wherein the first and the second elements have a second predefined boundary further comprising:
    verifying that the second position value is within the second predefined boundary; and,
    adjusting the second position value when the second position value is not within the predefined boundary.

45. The method according to claim 44 wherein the step of adjusting the second position value further comprises:
    applying an impulse to the first element.

46. The method of generating an image according to claim 42 further comprising the steps of:
    advancing a third virtual actuator wherein the third virtual actuator defines the movement in a third plane of the second element according to a third simulation of the solution for a third equation of motion for the damped oscillator.

47. The method according to claim 46 wherein for each frame the third equation of motion includes a third acceleration value, a third velocity value and a third position value and the step of advancing the third virtual actuator includes the steps of:
    simulating the solution of the third equation of motion of the damped oscillator for the third acceleration value;
    modifying the third velocity value according to the sum of the third velocity value of the preceding frame plus the third acceleration value of the current frame; and
    modifying the third position value according to the third position value of the preceding frame plus the third velocity value of the current frame.

48. The method according to claim 47 wherein the first and second elements have a third predefined boundary further comprising:
    verifying that the third position value is within the third predefined boundary; and,
    adjusting the third position value when the third position value is not within the third predefined boundary.

49. The method according to claim 48 the step of adjusting the first, second and third position values further comprises:

applying an impulse to the first element.

50. The method of generating with a computer an image according to claim 46 wherein the moveable figure further includes at least a third element connected to the second element at a second union the method comprising the steps of for each frame:
    advancing the third element towards the identified target for each frame of a sequence of frames;
    advancing at least a fourth virtual actuator wherein the fourth virtual actuator defines the movement along a ray between the first current frame and the first preceding frame of the third element according to a fourth simulation of the solution for a fourth equation of motion for the damped oscillator.

51. The method according to claim 50 wherein for each frame the fourth equation of motion includes a fourth acceleration value, a fourth velocity value and a fourth position value and the step of advancing the fourth virtual actuator includes the steps of:
    simulating the solution of the fourth equation of motion of the damped oscillator for the fourth acceleration value;
    modifying the fourth velocity value according to the sum of the fourth velocity value of the preceding frame plus the fourth acceleration value of the current frame; and
    modifying the fourth position value according to the fourth position value of a the preceding frame plus the fourth velocity value of the current frame.

52. The method according to claim 51 wherein the first, second and third elements have a predefined boundary further comprising:
    verifying that the fourth position value is within the predefined boundary; and
    adjusting the fourth position value when the fourth position value is not within the predefined boundary.

53. The method according to claim 52 wherein the step of adjusting the fourth position value further comprises:
    applying an impulse to the second element.

54. The method of generating with a computer an image according to claim 46 wherein the moveable figure further includes at least a third element connected to the second element at a second union the method comprising the steps of for each frame:
    advancing the third element towards the identified target for each frame of a sequence of frames;
    advancing at least a fourth virtual actuator wherein the fourth virtual actuator defines the movement in a first plane between the first current frame and the first preceding frame of the third element according to a fourth simulation of the solution for a fourth equation of motion for the damped oscillator.

55. The method according to claim 54 wherein for each frame the fourth equation of motion includes a fourth acceleration value, a fourth velocity value and a fourth position value and the step of advancing the fourth virtual actuator includes the steps of:
    simulating the solution of the fourth equation of motion of the damped oscillator for the fourth acceleration value;
    modifying the fourth velocity value according to the sum of the fourth velocity value of the preceding frame plus the fourth acceleration value of the current frame; and
    modifying the fourth position value according to the fourth position value of the preceding frame plus the fourth velocity value of the current frame.

56. The method according to claim 55 wherein the first, second and third elements have a predefined boundary further comprising:
    verifying that the fourth position value is within the fourth predefined boundary; and,
    adjusting the fourth position value when the fourth position value is not within the predefined boundary.

57. The method according to claim 56 wherein the step of adjusting the second position value further comprises:
    applying an impulse to the second element.

58. The method of generating with a computer an image according to claim 54 wherein the moveable figure includes at least a fourth element connected to the third element at a third union and wherein the method comprising the steps of:
    advancing the fourth element towards the identified target for each frame of a sequence of frames;
    advancing a fifth virtual actuator wherein the fifth virtual actuator defines the movement in the first plane between the first current frame and the first preceding frame of the fifth element according to a fifth simulation of the solution for a fifth equation of motion for the damped oscillator.

59. The method according to claim 58 wherein for each frame the fifth equation of motion includes a fifth acceleration value, a fifth velocity value and a fifth position value and the step of advancing the fifth virtual actuator includes the steps of:
    simulating the solution of the fifth equation of motion of the damped oscillator for the fifth acceleration value;
    modifying the fifth velocity value according to the sum of the fifth velocity value of the preceding frame plus the fifth acceleration value of the current frame; and
    modifying the fifth position value according to the fifth position value of the preceding frame plus the fifth velocity value of the current frame.

60. The method according to claim 59 wherein the first, second, third and fourth elements have a predefined boundary further comprising:
    verifying the fifth position value is within the predefined boundary; and
    adjusting the fifth position value when the fifth position value is not within the predefined boundary.

61. The method according to claim 60 wherein the step of adjusting the fifth position value further comprises:
    applying an impulse to the third element.

62. The method of generating an image according to claim 58 further comprising the steps of:
    advancing a sixth virtual actuator wherein the sixth virtual actuator defines the movement in the second plane between the first current frame and the first preceding frame of the fourth element according to a sixth simulation of the solution for a sixth equation of motion for the damped oscillator.

63. The method according to claim 62 wherein for each frame the sixth equation of motion includes a sixth acceleration value, a sixth velocity value and a sixth position value and the step of advancing the sixth virtual actuator includes the steps of:
    simulating the solution of the sixth equation of motion of the damped oscillator for the sixth acceleration value;
    modifying the sixth velocity value according to the sum of the sixth velocity value of the preceding frame plus the sixth acceleration value of the current frame; and
    modifying the sixth position value according to the sixth position value of the preceding frame plus the sixth velocity value of the current frame.

64. The method according to claim 63 wherein the first, second, third and fourth elements have a second predefined boundary further comprising:

verifying that the sixth position value is within the predefined boundary; and, adjusting the sixth position value when the sixth position value is not within the predefined boundary.

65. The method according to claim 64 wherein the step of adjusting the sixth position value further comprises:

applying an impulse to the third element.

66. An apparatus for generating with a computer an image having a moveable figure having a first and second element connected together at a first union and wherein at least the second element is displayed advancing towards an identified target for each frame wherein for each current frame there is a preceding frame of a sequence of frames the apparatus comprising:

means for identifying the target; and, means for advancing at least a first virtual actuator wherein the first virtual actuator defines the movement in a first plane of the second element according to a first simulation of the solution for a first equation of motion for a damped oscillator and wherein for each frame the first equation of motion includes a first acceleration value, a first velocity value and a first position value 68 and the means for advancing at least the first virtual actuator includes; means for simulating the solution of the first equation of motion of the damped oscillator for the first acceleration value, means for modifying the first velocity value according to the sum of the first velocity value of the preceding frame plus the first acceleration value of the current frame, and means for modifying the first position value according to the first position value of the preceding frame plus the first velocity value of the current frame.

67. The apparatus according to claim 66 wherein the first and second elements have a predefined boundary and the apparatus further comprising:

means for verifying that the first position value is within the first predefined boundary; and means for adjusting the first position value when the first position value is not within the predefined boundary.

68. The apparatus according to claim 67 wherein the means for adjusting the first position value further comprises:

means for applying an impulse to the first element.

69. The apparatus for generating an image according to claim 66 further comprising:

advancing a second virtual actuator wherein the second virtual actuator defines the movement in a second plane of the second element according to a second simulation of the solution for a second equation of motion for the damped oscillator.

70. The apparatus according to claim 69 wherein for each frame the second equation of motion includes a second acceleration value, a second velocity value and a second position value and the apparatus for advancing the second virtual actuator includes:

means for simulating the solution of the second equation of motion of the damped oscillator for the second acceleration value;

means for modifying the second velocity value according to the sum of the second velocity value of the preceding frame plus the second acceleration value of the current frame; and means for modifying the second position value according to the second position value of the preceding frame plus the second velocity value of the current frame.

71. The apparatus according to claim 70 wherein the first and the second elements have a predefined boundary further comprising:

means for verifying that the second position value is within the predefined boundary; and, means for adjusting the second position value when the second position value is not within the predefined boundary.

72. The apparatus according to claim 71 wherein the apparatus for adjusting the second position value further comprises:

means for applying an impulse to the first element.

73. The apparatus for generating an image according to claim 69 further comprising:

means for advancing a third virtual actuator wherein the third virtual actuator defines the movement in a third plane of the second element according to a third simulation of the solution for a third equation of motion for the damped oscillator.

74. The apparatus according to claim 73 wherein for each frame the third equation of motion includes a third acceleration value, a third velocity value and a third position value and the apparatus for advancing the third virtual actuator includes:

means for simulating the solution of the third equation of motion of the damped oscillator for the third acceleration value;

means for modifying the third velocity value according to the sum of the third velocity value of the preceding frame plus the third acceleration value of the current frame; and means for modifying the third position value according to the third position value of the preceding frame plus the third velocity value of the current frame.

75. The apparatus according to claim 74 wherein the first and second elements have a predefined boundary further comprising:

means for verifying that the third position value is within the third predefined boundary; and, means for adjusting the third position value when the third position value is not within the third predefined boundary.

76. The apparatus according to claim 75 the step of adjusting the third position values further comprises:

means for applying an impulse to the first element.

77. The apparatus for generating with a computer an image according to claim 73 wherein the moveable figure further includes at least a third element connected to the second element at a second union and wherein the third element is displayed advancing towards the identified target for each frame of a sequence of frames, the apparatus comprising:

means for advancing at least a fourth virtual actuator wherein the fourth virtual actuator defines the movement of alone a ray the third element according to a fourth simulation of the solution for a fourth equation of motion for the damped oscillator.

78. The apparatus according to claim 77 wherein for each frame the fourth equation of motion includes a fourth acceleration value, a fourth velocity value and a fourth position value and the step of advancing the fourth virtual actuator includes:

means for simulating the solution of the fourth equation of motion of the damped oscillator for the fourth acceleration value;

means for modifying the fourth velocity value according to the sum of the fourth velocity value of the preceding frame plus the fourth acceleration value of the current frame; and means for modifying the fourth position value according to the fourth position value of the preceding frame plus the fourth velocity value of the current frame.

79. The apparatus according to claim 78 wherein the first, second and third elements have a predefined boundary further comprising:

means for verifying that the fourth position value is within the predefined boundary; and means for adjusting the fourth position value when the fourth position value is not within the predefined boundary.

80. The apparatus according to claim 79 wherein the means for adjusting the fourth position value further comprises:

means for applying an impulse to the second element.

81. The apparatus for generating an image according to claim 73 further comprising:

means for advancing a fourth virtual actuator wherein the fourth virtual actuator defines the movement in a first plane of the third element according to a fourth simulation of the solution for a fourth equation of motion for the damped oscillator.

82. The apparatus according to claim 81 wherein for each frame the fourth equation of motion includes a fourth acceleration value, a fourth velocity value and a fourth position value and means for advancing the fourth virtual actuator includes:

means for simulating the solution of the fourth equation of motion of the damped oscillator for the fourth acceleration value;

means for modifying the fourth velocity value according to the sum of the fourth velocity value of the preceding frame plus the fourth acceleration value of the current frame; and means for modifying the fourth position value according to the fourth position value of the preceding frame plus the fourth velocity value of the current frame.

83. The apparatus according to claim 82 wherein the first, second and third elements have a predefined boundary further comprising:

means for verifying that the fourth position value is within the fourth predefined boundary; and, means for adjusting the fourth position value when the fourth position value is not within the predefined boundary.

84. The apparatus according to claim 83 wherein the means for adjusting the fourth position value further comprises:

means for applying an impulse to the second element.

85. The apparatus for generating with a computer an image according to claim 77 wherein the moveable figure includes a fourth element connected to the third element at a third union and wherein the fourth element is displayed advancing towards the identified target for each frame of a sequence of frames the apparatus comprising:

means for advancing a fifth virtual actuator wherein the fifth virtual actuator defines the movement in the first plane of the fifth element according to a fifth simulation of the solution for a fifth equation of motion for the damped oscillator.

86. The apparatus according to claim 85 wherein for each frame the fifth equation of motion includes a fifth acceleration value, a fifth velocity value and a fifth position value and the means for advancing the fifth virtual actuator includes:

means for simulating the solution of the fifth equation of motion of the damped oscillator for the fifth acceleration value;

means for modifying the fifth velocity value according to the sum of the fifth velocity value of the preceding frame plus the fifth acceleration value of the current frame; and means for modifying the fifth position value according to the fifth position value of the preceding frame plus the fifth velocity value of the current frame.

87. The apparatus according to claim 86 wherein the first, second, third and fourth elements have a predefined boundary further comprising:

means for verifying the fifth position value is within the predefined boundary; and means for adjusting the fifth position value when the fifth position value is not within the predefined boundary.

88. The apparatus according to claim 87 wherein the means for adjusting the fifth position value further comprises: means for applying an impulse to the third element.

89. The apparatus of generating an image according to claim 88 further comprising:

means for advancing a sixth virtual actuator wherein the sixth virtual actuator defines the movement in the second plane of the fourth element according to a sixth simulation of the solution for a sixth equation of motion for the damped oscillator.

90. The apparatus according to claim 89 wherein for each frame the second equation of motion includes a sixth acceleration value, a sixth velocity value and a sixth position value and means for advancing the sixth virtual actuator includes:

means for simulating the solution of the sixth equation of motion of the damped oscillator for the sixth acceleration value;

means for modifying the sixth velocity value according to the sum of the sixth velocity value of the preceding frame plus the sixth acceleration value of the current frame; and means for modifying the sixth position value according to the sixth position value of the preceding frame plus the sixth velocity value of the current frame.

91. The apparatus according to claim 90 wherein the first, second, third and fourth elements have a predefined boundary further comprising:

means for verifying that the sixth position value is within the predefined boundary; and, means for adjusting the sixth position value when the sixth position value is not within the predefined boundary.

92. The apparatus according to claim 91 wherein the means for adjusting the sixth position value further comprises:

means for applying an impulse to the third element.

* * * * *